United States Patent
Najaf-Zadeh et al.

(10) Patent No.: US 11,039,115 B2
(45) Date of Patent: Jun. 15, 2021

(54) LOW COMPLEXITY COLOR SMOOTHING OF RECONSTRUCTED POINT CLOUDS

(71) Applicant: Samsung Electronics Co., Ltd., Suwon-si (KR)

(72) Inventors: Hossein Najaf-Zadeh, Allen, TX (US); Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/706,397

(22) Filed: Dec. 6, 2019

(65) Prior Publication Data

US 2020/0204782 A1    Jun. 25, 2020

Related U.S. Application Data

(60) Provisional application No. 62/861,525, filed on Jun. 14, 2019, provisional application No. 62/837,240, (Continued)

(51) Int. Cl.
*H04N 13/15* (2018.01)
*H04N 13/133* (2018.01)
(Continued)

(52) U.S. Cl.
CPC ........... *H04N 13/15* (2018.05); *H04N 13/133* (2018.05); *H04N 13/161* (2018.05); *H04N 19/167* (2014.11); *H04N 19/186* (2014.11)

(58) Field of Classification Search
CPC .................................................. H04N 13/161
See application file for complete search history.

(56) References Cited

U.S. PATENT DOCUMENTS

| 7,003,136 B1 | 2/2006 | Harville |
| 10,535,161 B2 * | 1/2020 | Budagavi ............... G06T 9/001 |

(Continued)

FOREIGN PATENT DOCUMENTS

KR   10-2018-0071928 A   6/2018

OTHER PUBLICATIONS

International Search Report and Written Opinion of the International Searching Authority in connection with International Application No. PCT/KR2019/018318 dated Apr. 17, 2020, 8 pages.

(Continued)

*Primary Examiner* — Paulos M Natnael

(57) ABSTRACT

A method and decoder for point cloud decoding. The method includes receiving and decoding a bitstream into multiple frames that include patches corresponding to respective clusters of points from a 3D point cloud. The method also includes generating a grid that includes a plurality of 3D cells, wherein the 3D point cloud is within the grid. The method further includes identifying a first cell of the plurality of 3D cells that includes a query point corresponding to a pixel on a boundary of one of the patches. The method additionally includes identifying a luminance value of the first cell. The method also includes performing color smoothing on the query point based on comparison of the luminance value of the first cell to a threshold.

20 Claims, 11 Drawing Sheets

Related U.S. Application Data filed on Apr. 23, 2019, provisional application No. 62/783,389, filed on Dec. 21, 2018.

(51) Int. Cl.
  H04N 19/167 (2014.01)
  H04N 19/186 (2014.01)
  H04N 13/161 (2018.01)

(56) References Cited

U.S. PATENT DOCUMENTS

| | | | | |
|---|---|---|---|---|
| 10,853,974 | B2* | 12/2020 | Budagavi | G06T 9/001 |
| 2005/0223337 | A1* | 10/2005 | Wheeler | G06T 19/00 |
| | | | | 715/806 |
| 2007/0024620 | A1 | 2/2007 | Muller-Fischer et al. | |
| 2016/0086353 | A1 | 3/2016 | Lukac et al. | |
| 2016/0142697 | A1 | 5/2016 | Budagavi et al. | |
| 2017/0214943 | A1* | 7/2017 | Cohen | G06T 9/00 |
| 2017/0347120 | A1* | 11/2017 | Chou | H04N 19/147 |
| 2018/0165871 | A1* | 6/2018 | Mrowca | G06T 19/20 |
| 2018/0324240 | A1* | 11/2018 | Fleureau | G06T 9/001 |
| 2020/0021844 | A1* | 1/2020 | Yea | H04N 19/597 |
| 2020/0105025 | A1* | 4/2020 | Yea | H04N 19/19 |
| 2020/0107028 | A1* | 4/2020 | Vosoughi | G06T 7/11 |
| 2020/0107048 | A1* | 4/2020 | Yea | H04N 19/96 |
| 2020/0120359 | A1* | 4/2020 | Hanhart | H04N 19/105 |
| 2020/0154137 | A1* | 5/2020 | Fleureau | H04N 19/172 |

OTHER PUBLICATIONS

Hossein Najaf-Zadeh, et al.; [PCC] TMC2 CE2.12 color smoothing of reconstructed point cloud; International Organisation for Standardisation Organisation Internationale de Normalisation ISO/IEC JTC1/SC29/WG11 Coding of Moving Pictures and Audio; ISO/IEC JTC1/SC29/WG11, m43717, Jul. 2018, Ljubljana, Slovenia; 11 pgs.

* cited by examiner

LOW COMPLEXITY COLOR SMOOTHING OF RECONSTRUCTED POINT CLOUDS

CROSS-REFERENCE TO RELATED APPLICATION AND CLAIM OF PRIORITY

This application claims priority under 35 U.S.C. § 119(e) to U.S. Provisional Patent Application No. 62/783,389 filed on Dec. 21, 2018; U.S. Provisional Patent Application No. 62/837,240 filed on Apr. 23, 2019; and U.S. Provisional Patent Application No. 62/861,525 filed on Jun. 14, 2019. The above-identified provisional patent applications are hereby incorporated by reference in its entirety.

TECHNICAL FIELD

This disclosure relates generally to multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds are can be used in the immersive environment.

Point clouds are a set of 3D points that represent an objects surface. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be manipulated onto traditional two-dimensional (2D) frames and that can be compressed and later be reconstructed and viewable to a user.

SUMMARY

This disclosure provides low complexity color smoothing of reconstructed point clouds.

In one embodiment, a decoder for point cloud decoding is provided. The decoder includes a communication interface and a processor operably coupled to the communication interface. The communication interface is configured to receive a bitstream. The processor is configured to decode the bitstream into multiple frames that include patches corresponding to respective clusters of points from a 3D point cloud. The processor is also configured to generate a grid that includes a plurality of 3D cells, wherein the 3D point cloud is within the grid. The processor is further configured to identify a first cell of the plurality of 3D cells that includes a query point corresponding to a pixel on a boundary of one of the patches. The processor is additionally configured to identify a luminance value of the first cell. The processor is also configured to perform color smoothing on the query point based on comparison of the luminance value of the first cell to a threshold.

In another embodiment, a method for point cloud decoding is provided. The method includes receiving and bitstream. The method also includes decoding the bitstream into multiple frames that include patches corresponding to respective clusters of points from a 3D point cloud. The method further includes generating a grid that includes a plurality of 3D cells, wherein the 3D point cloud is within the grid. The method additionally includes identifying a first cell of the plurality of 3D cells that includes a query point corresponding to a pixel on a boundary of one of the patches. The method includes identifying a luminance value of the first cell. The method also includes performing color smoothing on the query point based on comparison of the luminance value of the first cell to a threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
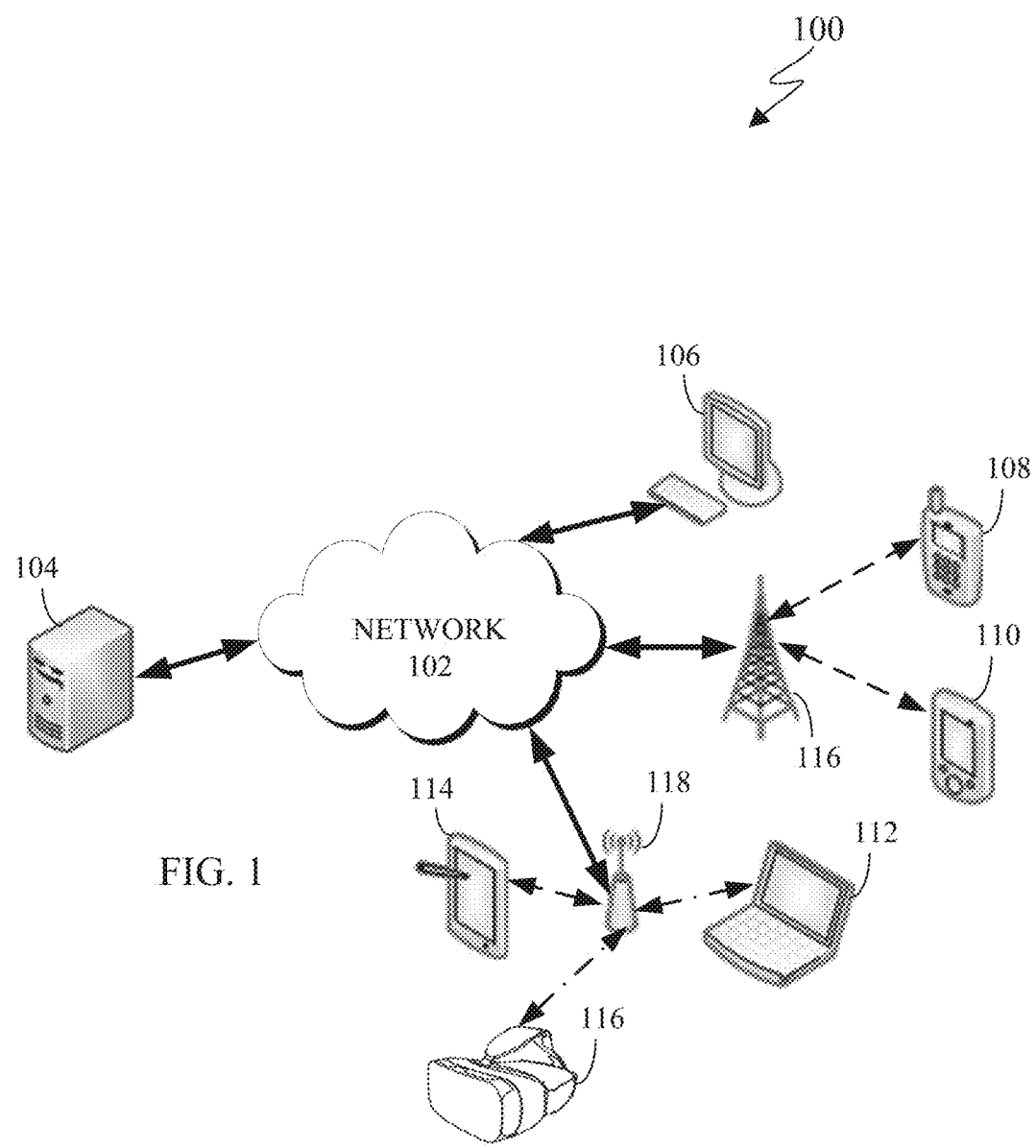
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD is a device that enables a user to view the VR scene and adjust the displayed content based on movements of the head of the user. A HMD represent one of many types of devices that provide AR and VR experiences to a user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point that is positioned in a particular position within 3D space and includes one or more attributes such as color (also referred to as texture). A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. Point clouds consist of multiple 3D points positioned in 3D space. Each point in a 3D point cloud includes an attribute such as a geometric position, represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In certain embodiments, the points are positioned throughout the internal structure and external surfaces of the object. Additionally, depending upon the application, each point in the point cloud can also include additional attributes such as color (also referred to as texture), reflectance, intensity, surface normal, and the like. In some embodiments, a single point of a 3D point cloud can have multiple attributes. A texture can refer to a color attribute other than the geometry attribute. A single point can have multiple attributes. For example, a first attribute can represent the geometric position of a point (such as a location of the point in 3D space), while a second attribute can represent the color of the point, a third attribute can represent the reflectiveness of the point, and yet the point can further include additional attributes such as intensity, surface normal, and the like. In some embodiments, an attribute refers only to a texture of a point, and not a geometric position of the points. In some applications, point clouds can also be used to approximate light field data in which, each point includes multiple view-dependent, color information (R, G, B or Y, U, V triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, a texture corresponding to the color of a point cloud can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D representation to a 2D representation. In certain embodiments, the conversion of a point cloud includes projecting the clusters of points of the 3D point cloud onto 2D frames by creating patches that represent the point cloud. Thereafter, video codecs such as HEVC, AVC, VP9, VP8, VVC, and the like can be used to compress the 2D frames representing the 3D point cloud similar to a 2D video.

Figure 4A:
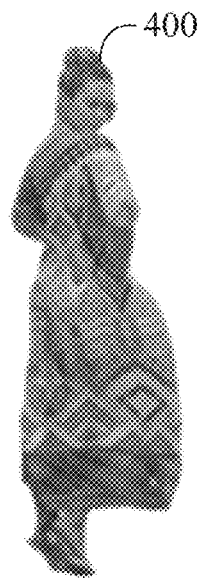
FIG. 4A illustrates an example 3D point cloud in accordance with an embodiment of this disclosure.
Figure 4B:
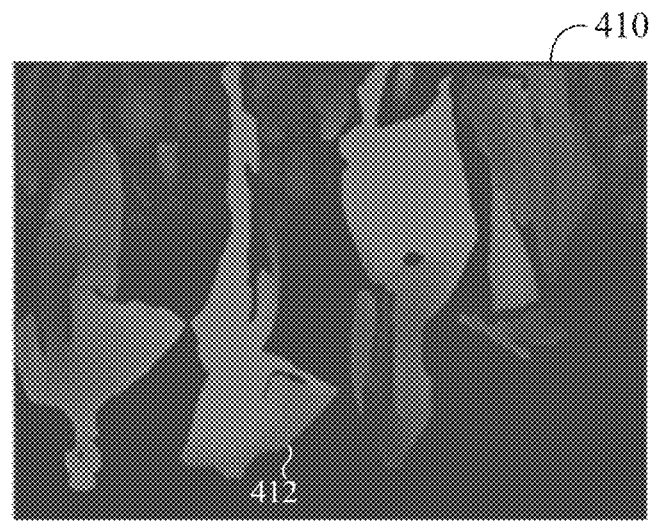
FIGS. 4B, and 4C illustrate 2D frames that represent the 3D point cloud in accordance with an embodiment of this disclosure.
Figure 4C:
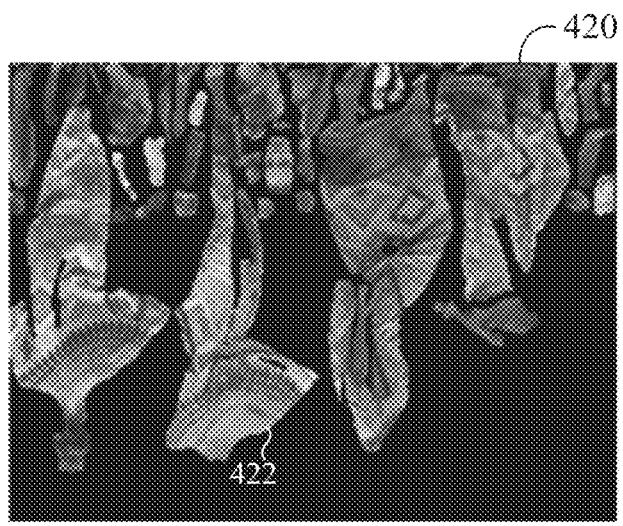

Compressing the point cloud includes projecting the point cloud to generate multiple patches and packing the patches onto one or more 2D frames, such that the frames can be compressed, and then transmitted to a display device. The frames can represent projections at different layers of the point cloud. The frames can also represent different attributes of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes.

Embodiments of the present disclosure provide systems and methods for converting a point cloud into a 2D representation that can be transmitted and then reconstructed into the point cloud. In certain embodiments, a point cloud is deconstructed into multiple patches, and multiple frames are generated that include the patches. In certain embodiments, a frame includes patches of the same attributes. The points of the 3D point cloud that are represented in one patch in one frame correspond to the same points that are represented in another patch in a second frame. In other embodiments, the patches in one frame represent multiple attributes associated with the points of the point cloud, such as a geometric position of the points in 3D space and color.

An encoder projects the 3D point cloud onto the multiple 2D frames and generates a bitstream. The encoder or another device then transmits the bitstream to a different device. The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

During projection the encoder decomposes the point cloud into a set of patches by clustering the points. The geometry and texture information of these patches are packed into geometry video frames and texture video frames, respectively. The geometry video frames are used to encode the geometry information, and the corresponding texture video frames are used to encode the texture (or other attributes) of the point cloud. Each pixel within a patch in the geometry video frame corresponds to a point in 3D space. The two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

Embodiments of the present disclosure provide systems and methods for improving the reconstruction of a 3D point cloud. Improving the reconstruction of a 3D point cloud reduces the processing power necessary for reconstructing 3D point cloud as well as increase the visual quality of the 3D point cloud. For example, smoothing the boundaries of the patches at the decoder can improve the visual appearance of the point cloud while the quantity data transmitted representing the point can be decreased.

According to embodiments of the present disclosure, architecture and methods for performing point cloud compression and decompression using a video codec is provided. When a 3D point cloud is converted from a 3D representation to a 2D representation, the points of 3D point cloud are clustered into groups and projected onto frames, where the clustered points result in patches that are packed onto 2D frames. Due to the size constraints of certain 2D frames, two patches that are not next to each other on the 3D point cloud can be packed next to each other in a single frame. When two non-neighboring patches of the point cloud are packed next to each other in a 2D frame, the pixels from one patch can be inadvertently mixed up with the pixels from the other patch by the block-based video codec. When pixels from one patch are inadvertently included in another patch, visible artifacts can occur at patch boundaries when the point cloud is reconstructed by the decoder. Therefore, embodiments of the present disclosure provide systems and methods for smoothing the color of the points near the patch boundary to avoid visual artifacts. Removing visual artifacts improves the visual quality of the point cloud. Smoothing the color component of the point cloud at the decoder can create similar visual quality at a lower bit-rate.

Embodiments of the present disclosure provide systems and methods for smoothing the color attribute of a point cloud. Embodiments of the present disclosure can be extended to smooth other attributes in addition to or in alternative of the color attribute.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
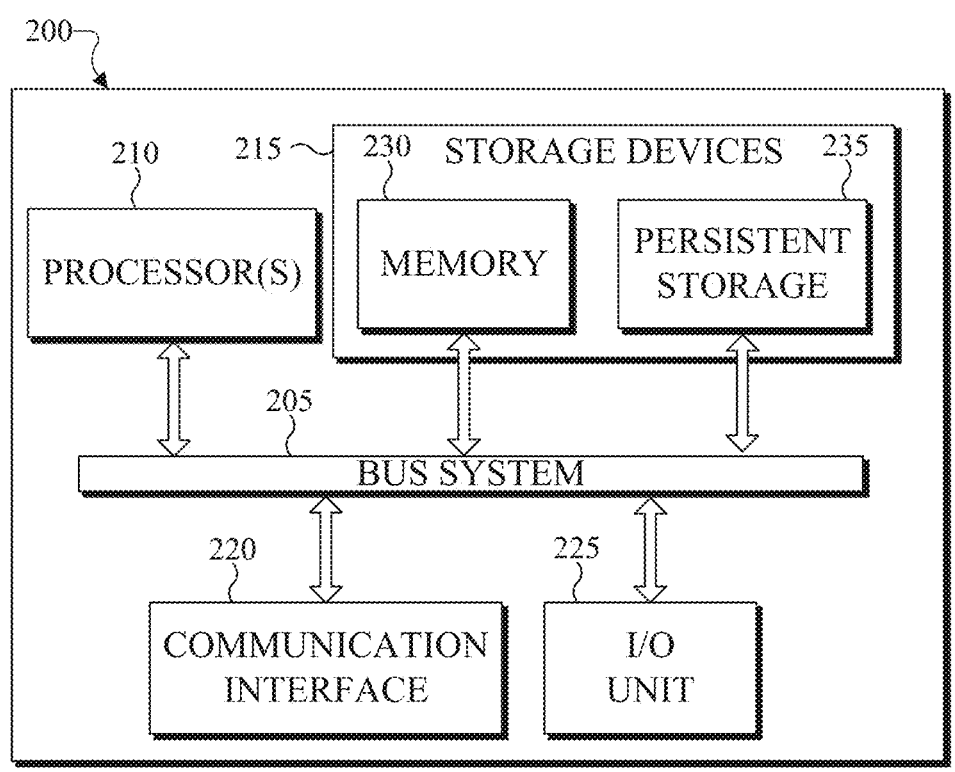
FIGS. 2 and 3 illustrate example electronic devices in accordance with an embodiment of this disclosure.
Figure 3:
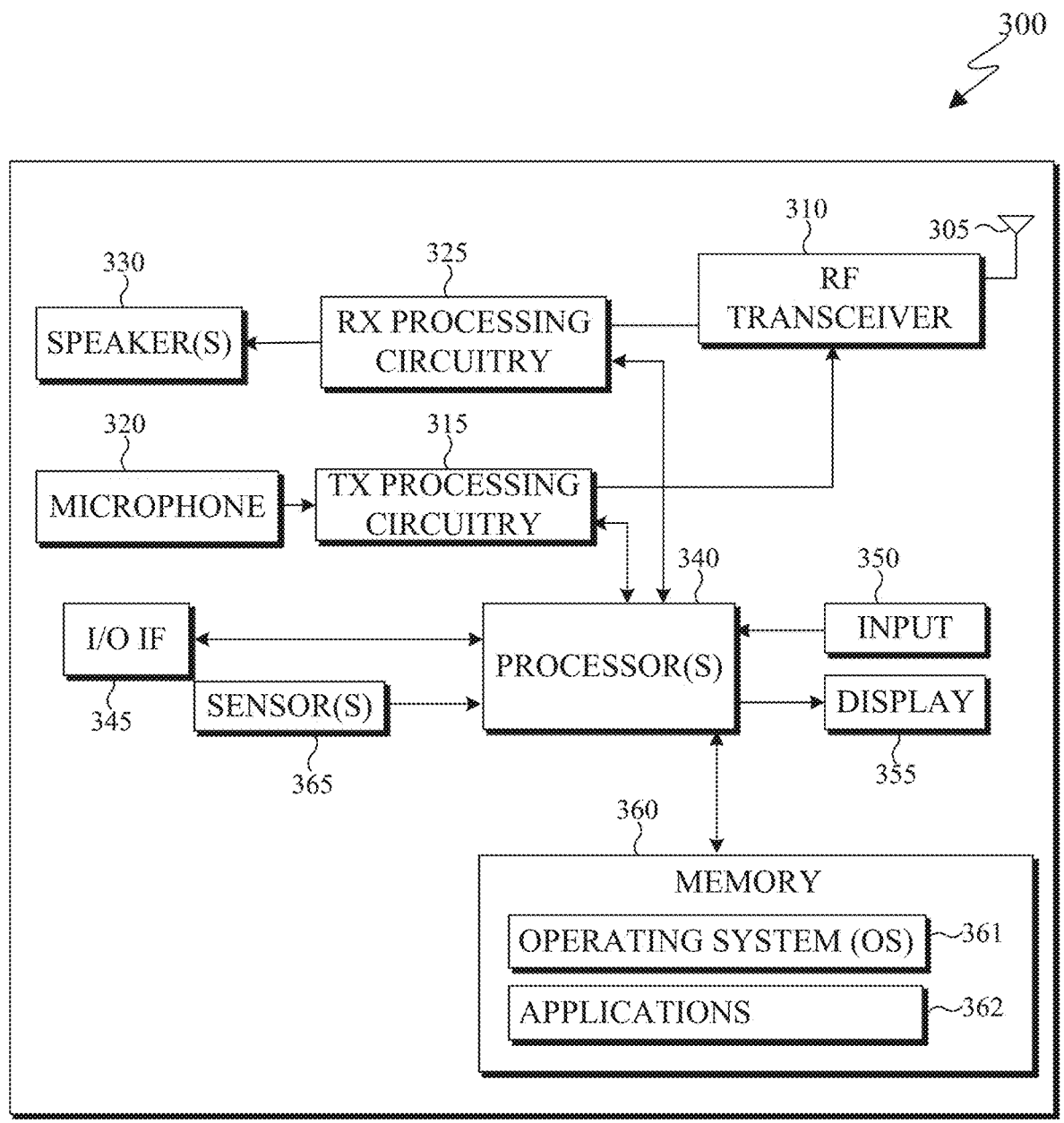

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 can project the point cloud into multiple patches. For example, a cluster of points of the point cloud can be grouped together to generate a patch. A patch can represent a single attribute of the point cloud, such as geometry, color, and the like. Patches that represent the same attribute can be packed into individual 2D frames, respectively. FIGS. 4A-4C, which are described in greater detail below, illustrate a 3D point cloud that is represented by patches in different frames.

The 2D frames are then encoded to generate a bitstream. During the encoding process additional content such as metadata, flags, occupancy maps, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, or any combination thereof. A geometry frame can include pixels that indicate geographic coordinates of points of the point cloud in 3D space. Similarly, a color frame can include pixels that indicate the RGB (or YUV) color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4D:
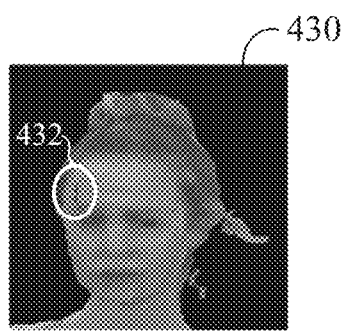
FIG. 4D illustrates an example color artifact in a reconstructed 3D point cloud in accordance with an embodiment of this disclosure.

FIGS. 4A, 4B, 4C, and 4D illustrate an example 3D point cloud and 2D frames that represent the 3D point cloud in accordance with an embodiment of this disclosure. In particular, FIG. 4A illustrates a 3D point cloud 400, and FIGS. 4B and 4C each illustrate a 2D frame that includes patches. The FIG. 4B illustrates a 2D frame 410 that represents the geometric position of points of the 3D point cloud 400. The FIG. 4C illustrates the frame 420 that represents the color (or another attribute) associated with points of the 3D point cloud 400. The FIG. 4D illustrates an example color artifact 432 in a reconstructed point cloud 430. In certain embodiments, the reconstructed point cloud 430 is similar to the 3D point cloud 400 of FIG. 4A. The embodiment of FIGS. 4A, 4B, and 4C, are for illustration only and other embodiments could be used without departing from the scope of this disclosure.

The 3D point cloud 400 is a set of data points in 3D space. Each point of the 3D point cloud 400 includes multiple attributes such as (i) geometric position that provides the structure of the 3D point cloud and (ii) one or more attributes that provide information about each point such as color, reflectiveness, material, and the like.

FIGS. 4B and 4C illustrate the 2D frames 410 and 420, respectively. Generally, the attributes of the 3D point cloud 400 are clustered and projected on to different planes. The attributes of the 3D point cloud 400 are projected using predefined criteria such as normal direction, distance to the projected frames, contiguity, and the like. The different plans can be the XY plane, the YZ plane, or the XZ plane. Each of the clusters corresponds to a patch when projected onto a plane. For example, the frame 410, depicts multiple patches (such as a patch 412) representing geometry of the points of the 3D point cloud 400. In particular, the patches within the frame 410 depict the depth values of the 3D point cloud 400 from different projection planes. In certain embodiments, the level of illumination of each pixel in the frame 410 indicates the distance that the represented point is from the projection plane. The frame 420, depicts multiple patches (such as a patch 422) representing the color of the 3D point cloud 400.

The patches (such as the patches 412 and 422) are sorted and packed into a respective 2D frame. For example, the patch 412 is packed into a frame 410, which represents the geometric position of the points of the 3D point cloud 400. Similarly, the patch 422 is packed into the frame 420, which represents color of the 3D point cloud 400.

When the frames 410 and 420 are generated, non-neighboring points in 3D space could end up next to each other in the frames. For example, two clusters of points that are not next to each other in 3D space could be packed adjacent to one another in the frames 410 and 420.

Each pixel in the frame 420 corresponds to a pixel at the same location in the frame 410. For example, a mapping is generated between each pixel in the frame 410 and the frame 420. The location of the patches within the 2D frames 410 and 420 can be similar for a single position of the 3D point cloud. Similarly, a coordinate (u, v) of a pixel within the frame 410 corresponds to a similar pixel at the same coordinate (u, v) in the frame 420. As the 3D point cloud 400 changes, new frames can be generated with different patches based on the new position the 3D point cloud.

The frames are then encoded with a video codec such as HEVC, AVC, VP9, VP8, VVC, AVC, and the like. A decoder can receive the frames 410 and 420 and reconstructs the geometry of the 3D point cloud from the frame 410 and colors the geometry of the point cloud based on the frame 420 in order to generate the reconstructed point cloud 430.

The reconstructed point cloud 430 should be similar the 3D point cloud 400. When the frames 410 and 420 are encoded and compressed, the values corresponding to pixels could be mixed up by a block based video codec. If the pixels within a single patch of the frame 420 get mixed up, the effect is often negligible when the point cloud is reconstructed as colors next to each other within a patch are often similar. However, if pixels at a boundary of one of the patches of the frame 420, such as the patch 422, get mixed up with pixels of another patch, an artifact, similar to the artifact 432, can created when the point cloud is reconstructed. Since the patches could be from drastically different parts of the point cloud, the coloring of the patches could be different. In a block-based video codec, a coding block may contain pixels from patches with very different coloring. This leads to leaking of color from patch to another patch with very different texture. As a result, visual artifacts are created which reduce the visual quality of the point cloud.

The reconstructed point cloud 430 illustrates the artifact 432. The artifact 432 can be created when a patch corresponding to the forehead of the model represented in the 3D point cloud 400 is packed into the frame 420 next to a patch that corresponds to another part of the 3D point cloud 400, such as the dress of the model represented in the 3D point cloud 400. As such, color values of a patch that represents a portion of the dress could leak to the patch corresponding to the forehead of the model represented in the 3D point cloud 400. In this example, the mix up of the color values results in an artifact that appear as a crack or hole in the face of the user which reduces the visual quality of the reconstructed point cloud 430. Embodiments of the present disclosure provide systems and methods for removing artifacts by smoothing the reconstructed point cloud at areas of an artifact while maintaining the quality of the point cloud. For example, points near patch boundaries of the reconstructed the point cloud are identified and smoothed.

Although FIGS. 4A, 4B, 4C, and 4D illustrate example point cloud and 2D frames representing a point cloud various changes can be made to FIGS. 4A, 4B, and 4C, and 4D. For example, the point cloud and point mesh represent a single object, whereas in other embodiments, a point cloud or point mesh can represent multiple objects, scenery (such as a landscape), a virtual object in AR, and the like. In another example, the patches included in the 2D frames can represent other attributes, such as luminance, material, and the like. FIGS. 4A, 4B, 4C, and 4D do not limit this disclosure to any particular 3D object(s) and 2D frames representing the 3D object(s).

Figure 5A:
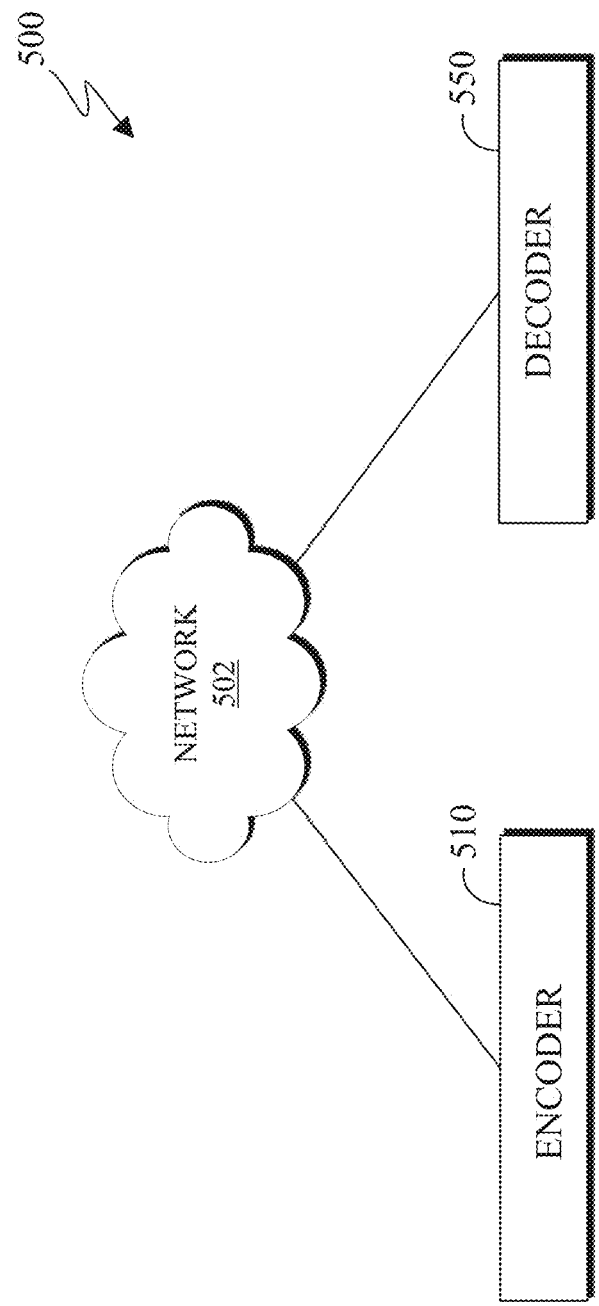
FIG. 5A illustrates a block diagram of an example environment-architecture in accordance with an embodiment of this disclosure.
Figure 5B:
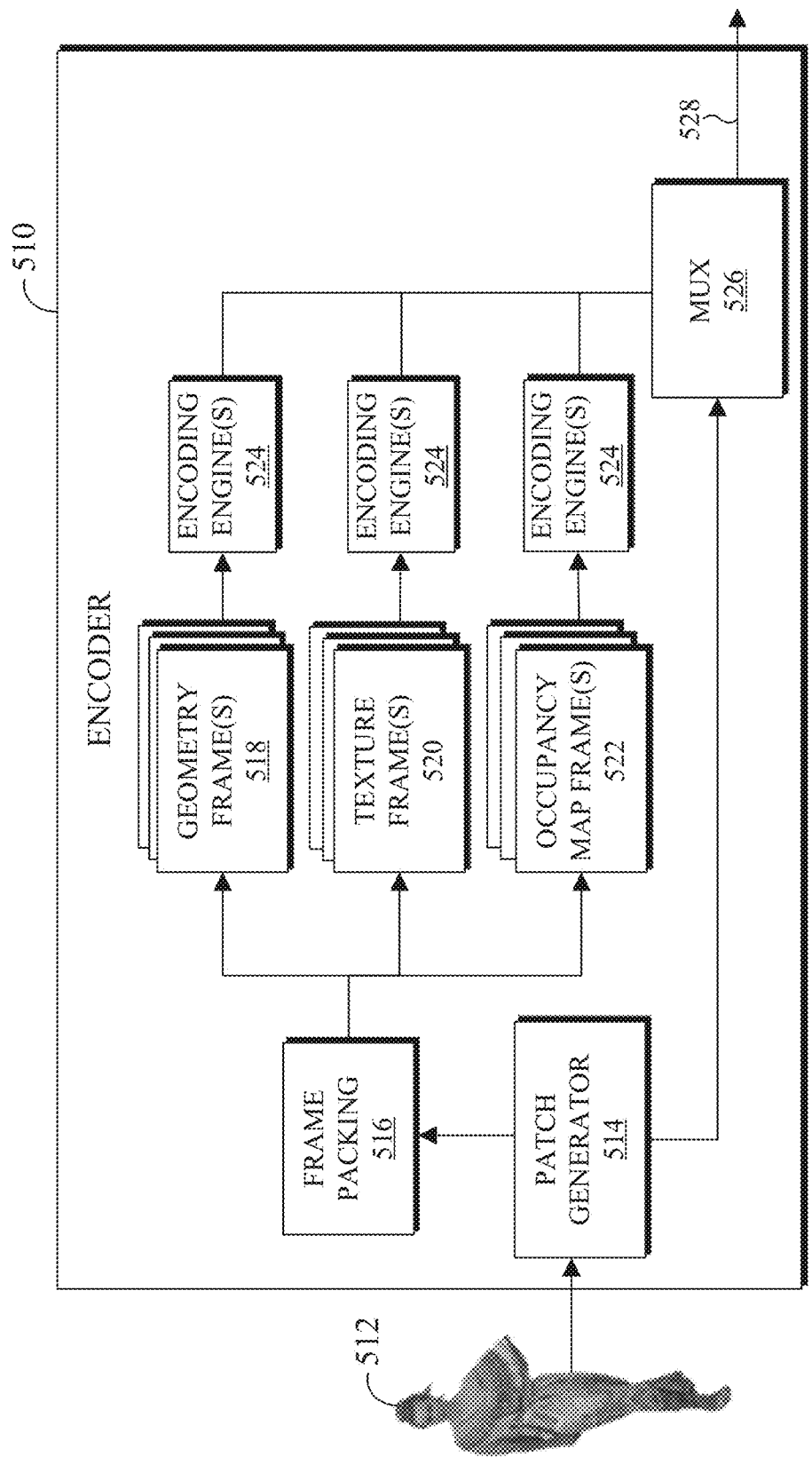
FIG. 5B illustrates an example block diagram of an encoder in accordance with an embodiment of this disclosure.
Figure 5C:
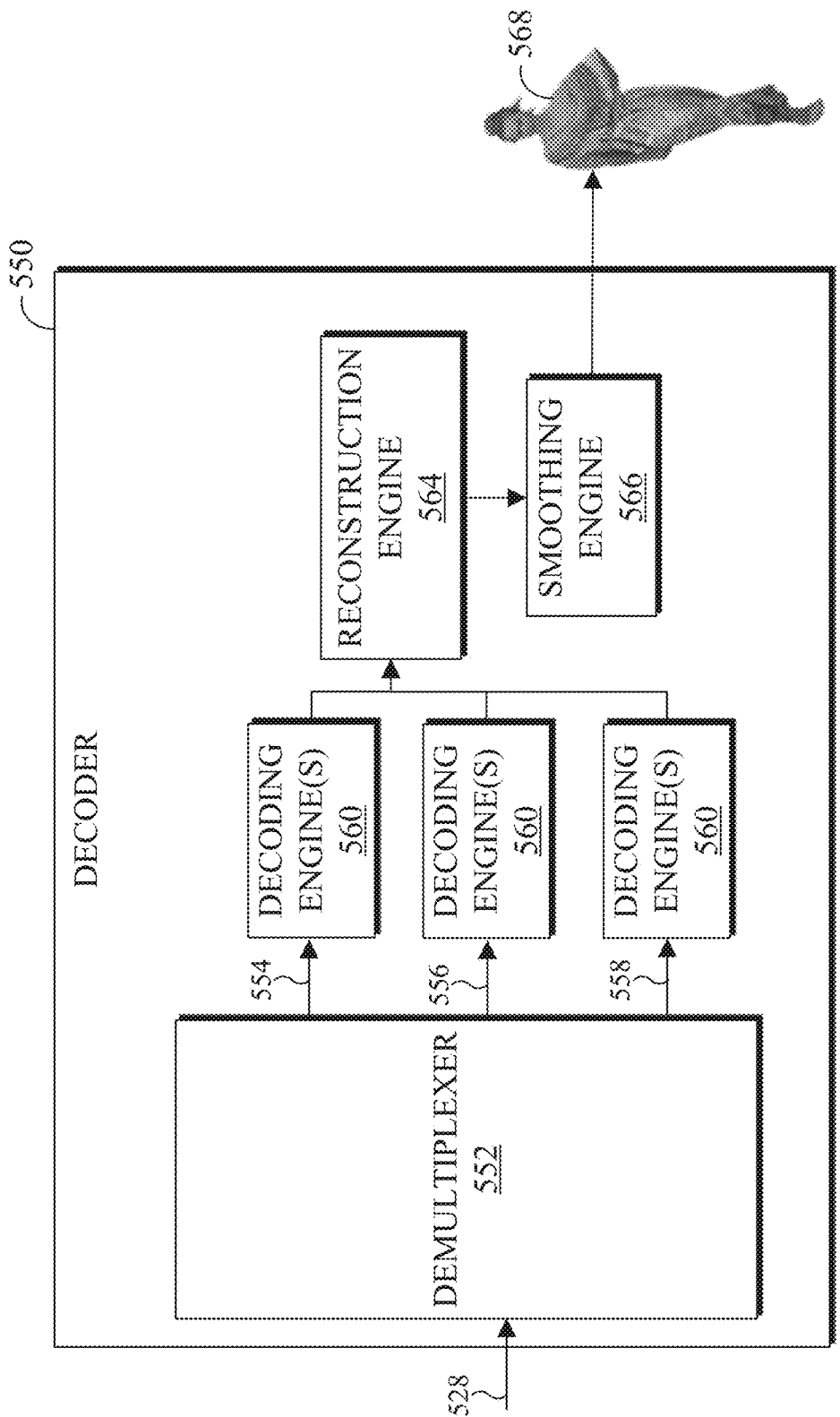
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receive 3D media content, such as a point cloud, from another device such as a server (similar to the server 104 of FIG. 1, the server 200 of FIG. 2) or an information repository (such as a database). In certain embodiments, the encoder 510 can receive media content from multiple cameras and stitch the content together to generate a 3D scene that includes one or more point clouds.

In certain embodiments, the encoder 510 projects a point cloud into two dimensions which create patches that represent the projection. The encoder 510 clusters points of a point cloud into groups which are projected onto different planes such as an XY plane, an YZ plane, and an XZ plane. Each cluster of points is represented by a patch when projected onto a plane. The encoder 510 can project a point cloud into two dimensions. It is noted, that a point of the 3D point cloud is located in 3D space based on a (X, Y, Z) coordinate value. When the point is projected onto a 2D frame the pixel, representing the projected point, is denoted by the column and row index in the frame indicated by the coordinate (u, v). Additionally, 'u' and 'v' can range from zero to the number of rows or columns in the depth image, respectively.

The encoder 510 packs the patches representing the point cloud onto 2D video frames. Each of the 2D video frames represents a particular attribute, such as one set of frames can represent geometry and another set of frames can represent a texture. It should be noted that additional frames can be generated based on more layers as well as each additionally defined attribute.

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550 can receive a bitstream that represents media content, such as a point cloud. The bitstreams can include data representing a 3D point cloud. In certain embodiments, the decoder 550 can decode the bitstream and generate multiple frames such as geometry and texture. The decoder 550 reconstructs the point cloud from multiple frames. The decoder 550 can identify points on the reconstructed 3D point cloud that were represented on or near a boundary of one of the patches on one of the frames. Depending on the color and luminance in proximity to the points near a patch boundary, the decoder 550 determines whether smoothing is necessary. When the decoder 550 determines that smoothing is necessary, the decoder 550 modifies the color of the boundary points in order to remove any artifacts. The decoder 550 is described with more detail below in FIG. 5C.

FIG. 5B illustrates the encoder 510 that receives a 3D point cloud 512 and generates a bitstream 528. The bitstream 528 includes data representing a received 3D point cloud 512. The bitstream 528 can include multiple bitstreams and can be transmitted via the network 502 of FIG. 5A to another device, such as the decoder 550 or an information repository. The encoder 510 includes a patch generator 514, a frame packing 516, various frames (such as one or more geometry frames 518, one or more texture frames 520, and one or more occupancy map frames 522), one or more encoding engines 524, and a multiplexer 526.

The 3D point cloud 512 can be stored in memory (not shown) or received from another electronic device (not shown). The 3D point cloud 512 can be a single 3D object, or a grouping of 3D objects. The 3D point cloud 512 can be stationary object or an object which moves.

The patch generator 514 generates patches by taking projections of the 3D point cloud 512. In certain embodiments, the patch generator 514 splits the geometry attribute and each of other attributes of each point of the 3D point cloud 512. The patch generator 514 can use two or more projection planes, to cluster the points of the 3D point cloud 512 to generate the patches. The geometry attribute and each texture attribute are eventually packed into respective geometry frames 518 or the texture frames 520, by the frame packing 516.

For each input point cloud, such as the 3D point cloud 512, the geometry attribute and one or more attributes (such as color) are clustered using one or more criteria. The criteria include a normal direction, a distance to projected frames, contiguity, and the like. After the points are clustered, the geometry attribute and a corresponding texture attribute for each point are projected onto planes, such as the XY plane, the YZ plane, or the XZ plane.

When projected, each cluster of points of the 3D point cloud 512 appears as patch. Each patch (also referred to as a regular patch) represents a particular attribute of the point cloud. For example, a single cluster of points can be represented as multiple patches on multiple frames, where each patch represents a different attribute. It is noted that patches representing different attributes of the same cluster of points include a correspondence or a mapping, such that a pixel in one patch corresponds to the same pixel in another patch.

In certain embodiments, multiple frames of the same 3D point cloud using two or more projection planes can be generated. In certain embodiments, the patch generator 514 splits geometry aspects of each point of the 3D point cloud 512 and the texture components of each point of the 3D point cloud 512, which are placed on respective geometry frames 518 or the texture frames 520.

The frame packing 516 sorts and packs the patches (both the geometry and texture patches) into respective frames, such as the geometry frames 518 and the texture frames 520. As illustrated in FIGS. 4B and 4C, the frame packing 516 organizes the attributes and places the patches within corresponding frames, such as the patch 412 representing geometry is included in the frame 410 and the patch 422 representing a texture (i.e. color) is included in the frame 420. The frame packing 516 also generates one or more occupancy map frames 522 based on the placement of the patches within the geometry frames 518 and the texture frames 520.

The geometry frames 518 include pixels representing the geometry values of the 3D point cloud 512. Geometry represent is the geographic location of each point of the 3D point cloud 512. The texture frames 520 include pixels representing values of the color attribute of the 3D point cloud 512. Texture represents the color attribute of each point of the 3D point cloud 512. For example, if the geometry frame 518 indicates where each point of the 3D point cloud 512 is in 3D space, then the corresponding texture frame 520 indicates the color of each corresponding point. Additional frames can be created that represent other attributes. For example, if another set of frames are generated, such as reflectance frames (not shown) then the corresponding reflectance frame indicates the level of reflectance of each corresponding point represented by the geometry frame 518. In certain embodiments, each geometry frame 518 has at least one corresponding texture frame 520.

The occupancy map frames 522 represent occupancy maps that indicate the valid pixels in the frames (such as the geometry frames 518 and the texture frames 520). For example, the occupancy map frames 522 indicate whether each point in a frame is a valid pixel or an invalid pixel. The valid pixels correspond to pixels that represent points of the 3D point cloud 512. The invalid pixels are pixels within a frame that do not represent to a point of the 3D point cloud 512. In certain embodiments, one of the occupancy map frames 522 can correspond to both a geometry frame 518 and a texture frame 520.

For example, when the frame packing 516 generates the occupancy map frames 522, the occupancy map frames include a value of zero or one for each pixel. When a pixel of the occupancy map at position (u, v) is a value of zero, indicates that the pixel at (u, v) in the geometry frame 518 and the texture frame 520 are invalid. When a pixel of the occupancy map at position (u, v) is a value of one, indicates that the pixel at (u, v) in the geometry frame 518 and the texture frame 520 are valid.

The encoding engines 524 encode the geometry frames 518, the texture frames 520, and the occupancy map frames 522. In certain embodiments, the frames (such as the geometry frames 518, the texture frames 520, and the occupancy map frames 522) are encoded by independent encoders. For example, one encoding engine 524 can encode the geometry frames 518, another encoding engine 524 can encode the texture frames 520, and yet another encoding engine 524 can encode the occupancy map frames 522. In certain embodiments, the encoding engines 524 can be configured to support an 8-bit, a 10-bit, a 12-bit, a 14-bit, or a 16-bit, precision of data. The encoding engine 524 can be a video or image codec such as HEVC, AVC, VP9, VP8, VVC, and the like to compress the 2D frames representing the 3D point cloud.

When the geometry frames 518, the texture frames 520, and the occupancy map frames 522 are encoded by the encoding engines 524, pixels from one patch can be inadvertently mixed up with the pixels from another patch. As a result, visible artifacts can be created in the reconstructed point cloud, reducing the visual quality of the point cloud. For example, color of pixels within the texture frame 520 can change slightly. Generally, a slight color change may not significantly reduce the visual quality of the point cloud when the pixel is in the middle of a patch. However, a significant color change at a patch boundary creates artifacts.

The multiplexer 526 combines the multiple frames (such as the geometry frames 518, the texture frames 520, and the occupancy map frames 522) which are encoded, to create a bitstream 528.

FIG. 5C illustrates the decoder 550 that includes a demultiplexer 552, one or more decoding engines 560, a reconstruction engine 564, and a smoothing engine 566. The decoder 550 receives a bitstream 528, such as the bitstream that was generated by the encoder 510. The demultiplexer 552 separates bitstream 528 into one or more bitstreams representing the different frames. For example, the demultiplexer 552 separates various streams of data such as the geometry frame information 554 (originally the geometry frames 518 of FIG. 5B), texture frame information 556 (originally the texture frames 520 of FIG. 5B), and the occupancy map information 558 (originally the occupancy map frames 522 of FIG. 5B).

The decoding engines 560 decode the geometry frame information 554 to generate the geometry frames. The decoding engines 560 decode the texture frame information 556 to generate the texture frames. Similarly, the decoding engines 560 decode the occupancy map information 558 to generate the occupancy map frames. In certain embodiments, a single decoding engine 560 decodes the geometry frame information 554, the texture frame information 556, and the occupancy map information 558.

After the geometry frame information 554, the texture frame information 556, and the occupancy map information 558 are decoded, the reconstruction engine 564 generates a reconstructed point cloud by reconstructing the decoded geometry frame information 554, the decoded texture frame information 556, and the decoded occupancy map information 558. The reconstructed point cloud is similar to the 3D point cloud 512 with the possibility of one or more artifacts.

Figure 7A:
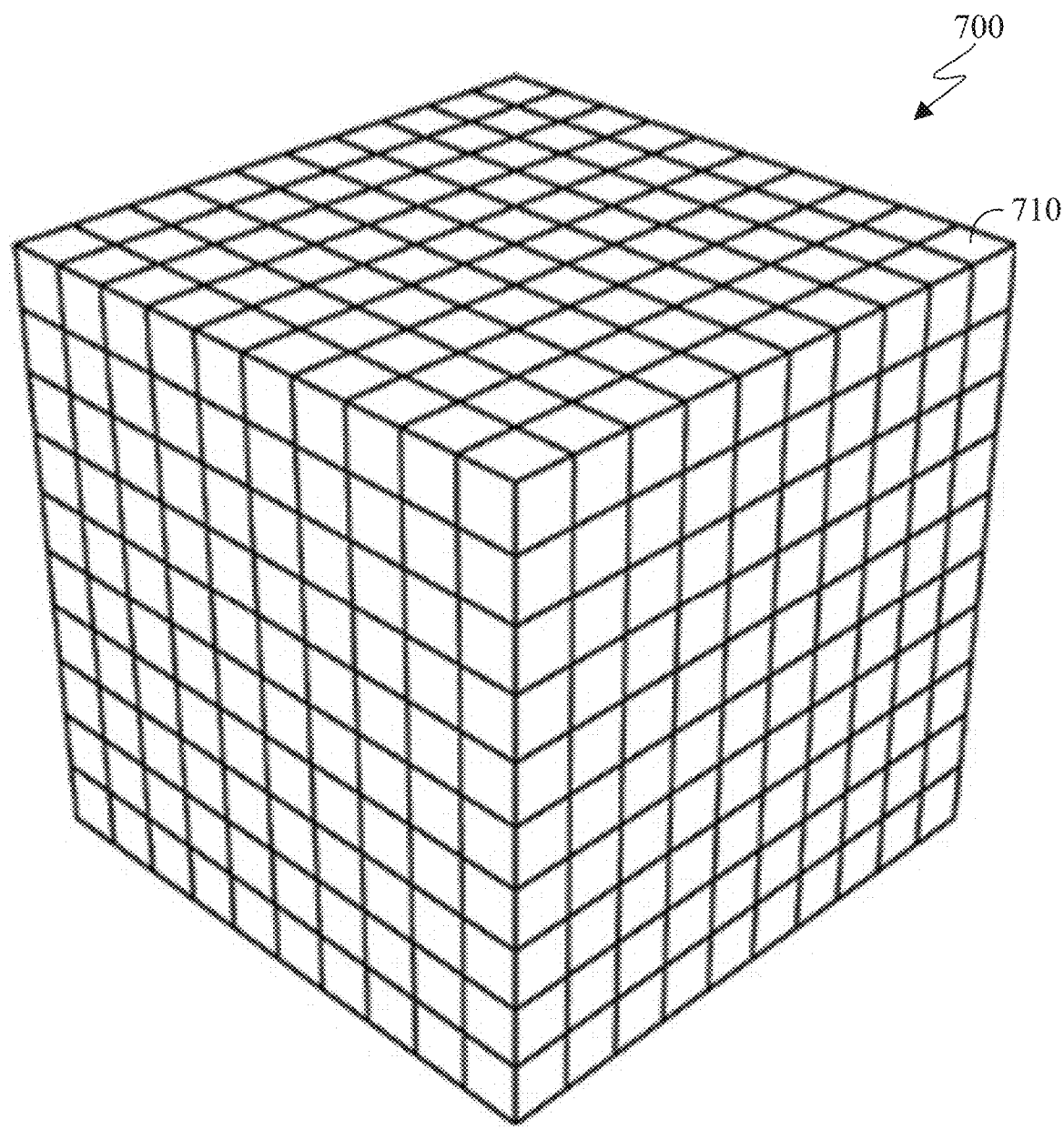
FIG. 7A illustrates an example grid and cells in accordance with an embodiment of this disclosure.

The smoothing engine 566 generates a 3D grid and places the reconstructed point cloud within the grid. The grid is composed of multiple non-overlapping cells. The shape of each cell can be the same for every cell within the grid or the shape can vary from cell to cell. In Certain embodiments, the size of each cell within the grid can be the same. The size of the cells affects the level of smoothing. For example, larger cells can cause more smoothing to occur. In certain embodiments, the size of each cell is 2×2×2. FIG. 7A, described below, illustrates an example grid with multiple cells of the same size.

In certain embodiments, the size of each cell varies. For example, the cells can be positioned over a portion of the point cloud with similar colors. That is, point cloud can be split into a non-uniform grid. Grouping points in a non-uniform grid would cluster points with similar color in geometric proximity to each other into a single cell. Grouping points of like colors into a single cell avoids the possibility of mixing up points with very different color into the same cell. For example, the smoothing engine 566 can generate a uniform grid with large cells. After generating a grid with large cells, the smoothing engine 566 splits some cells into smaller cells depending on the color variations within each cell to avoid large color variation inside cells.

In certain embodiments, the smoothing engine 566 identifies the color centroid of each cell. To identify the color centroid of a cell, the smoothing engine 566 averages the red values of each point within the cell, the blue values of each point within the cell, and the green values of each point within the cell. The resulting red values, blue values, and green values represent the color centroid of that one cell. In certain embodiments, the smoothing engine 566 identifies the luminance value of the cells. The luminance value is based on the difference between the mean and median luminance values of each point within the cell.

After generating the 3D grid, the smoothing engine 566 identifies each cell that includes a point that was represented by a pixel positioned on or near a boundary of one of the patches in the 2D frames (such as the geometry frame 518 and the texture frame 520). The smoothing engine 566 identifies a point that was represented by a pixel positioned on or near a boundary of one of the patches in the 2D frames based on the occupancy map information 558. For example, the occupancy map includes a value such as one or zero at each pixel location. The value of a pixel at coordinate (u, v) in the occupancy map frame indicates whether a pixel at the same (u, v) coordinate in the geometry frame or texture frame is a valid pixel (representing a point of the 3D point cloud 512) or an invalid pixel (not representing a point of the 3D point cloud 512). For example, a pixel value of one at a position (u, v) in the occupancy map frame indicates that a pixel at the same position (u, v) in the texture frame is a valid pixel. A pixel value of zero at a position (u, v) in the occupancy map frame indicates that a pixel at the same position (u, v) in the texture frame is a not a pixel. As such, the smoothing engine 566 inspects the occupancy map information 558 to identify a valid pixel that has an invalid neighboring. A valid pixel whose neighbor is invalid is identified as a pixel positioned on a boundary of one of the patches within a frame.

A point that was represented by a pixel positioned on or near a boundary of one of the patches in the 2D frames is denoted as a query point. The smoothing engine 566 determines whether the query point needs to be smoothed. Upon determining that the query point needs to be smoothed, the smoothing engine 566 performs the smoothing.

In one embodiment, the smoothing engine 566 identifies the query point, and replaces that point with the color centroid of cell to which the point is within. Alternatively, the smoothing engine 566 determines whether the query point is to be smoothed, based on the luminance value of the cell that contains the query point. The luminance value represents a quantity of texture within the cell. If the cell includes points that are highly textured, such as portions of the dress of the 3D point cloud 512, the smoothing engine 566 determines smoothing is not needed as the existence of an artifact reducing the visual quality of the point cloud is low. If the cell includes points that are smooth, such as the face of the 3D point cloud 512, the smoothing engine 566 determines smoothing is needed as the potential existence of an artifact reducing the visual quality of the point cloud is high, as illustrated by the artifact 432 of FIG. 4D on the face of the point cloud. It is noted that the smoothing engine 566 compares the luminance value of the cell with the query point to a threshold, to determine whether smoothing is needed for the cell.

After determining that the point cloud needs to be smoothed, the smoothing engine 566 identifies neighbors of the cell that includes the query point. Each cell, within the grid, includes 26 neighboring cells. The smoothing engine 566 selects a portion of the neighboring cells based on the location of the query point within the cell. In certain embodiments, seven neighboring cells are selected. In certain embodiments, eight neighboring cells are selected. For example, if the query point is positioned in the lower left quadrant of the cell, the neighboring cells located on the left and below the cell that includes the query point are selected.

The smoothing engine 566 then determines whether to exclude any of the selected neighboring cells as one of the neighboring cells. The smoothing engine 566 excludes neighboring cells with internal color variations that exceed a threshold. For example, if the luminance variation within any of the neighboring cells is larger than a threshold, then that neighboring cell is excluded from the group of selected neighboring cells. The luminance variation within any of the neighboring cells is based on the difference between the median and mean luminance. Equation (1), below describes the variation of luminance, where $\{Y_i\}$ are the luminance values of the points with a particular cell. Median is the middle value when the data is sequentially ordered, while mean is the average of all of the luminance values within the cell (the sum of all of the luminance values within the cell is divided by the number of values within the cell). Equation (2) describes the luminance values of a particular point i, where R, B, and B are the respective color values of the point i. Equation (2) is based on the content being within the BT.709 color space. Other color spaces can be used. When a different color space of the content is used, the luminance equation corresponding to the color space of the content is used. The difference between the median and mean luminance is compared against a threshold. In certain embodiments, if the difference between the median and mean luminance of a particular cell is larger than a threshold, that cell is excluded.

$$\delta = |\mathrm{median}(\{Y_i\}) - \mathrm{mean}(\{Y_i\})| \qquad \text{Equation (1)}$$

$$Y_i = 0.2126 * R_i + 0.7152 * G_i + 0.722 * B_i \qquad \text{Equation (2)}$$

The smoothing engine 566 also excludes neighboring cells whose color is too different than the cell with the query point. In particular, the smoothing engine 566 identifies a distance between the luminance value (or color centroid) of each neighboring cell to the cell with the query point and compares the distance to a threshold. In certain embodiments, if the difference between the luminance value (or color centroid) of the cell containing the query point and a luminance value (or color centroid) of a neighboring cell is greater than a threshold, that neighboring cell is excluded from the group of selected neighboring cells.

In certain embodiments, instead of using the luminance values of the neighboring cells or in addition to using the luminance values of the neighboring cells, the smoothing engine 566 can identify the color value of the neighboring cells. The color value is identified similarly to the luminance value. For example, the color value is the difference between the median color within a cell and the mean color within the cell. That is, the differences between the median and mean values for each color component is identified and the maximum value of these values is used for determining whether to perform smoothing. The color value can be used to determine whether smoothing is to be performed to the query point by comparing the color value of the cell to the threshold of color variation within cells. The color value can be used to determine which of the neighboring cells to exclude. For example, if the internal color value of any of the neighboring cells is higher than a threshold, that neighboring cell is excluded as a neighboring cell. For another example, the smoothing engine can compare the difference between the color value of a neighboring cell to the color value of the cell that includes the query point. If the difference between the color value of a neighboring cell to the color value of the cell that includes the query point that neighboring cell is excluded as a neighboring cell.

In certain embodiments, the smoothing engine 566 can use other measurements for color variation inside cells and between cells, instead of difference between median and mean value of luminance of color. For example, other statistics such as variance of color can be used to characterize the variation in color inside cells and between cells.

Figure 7B:
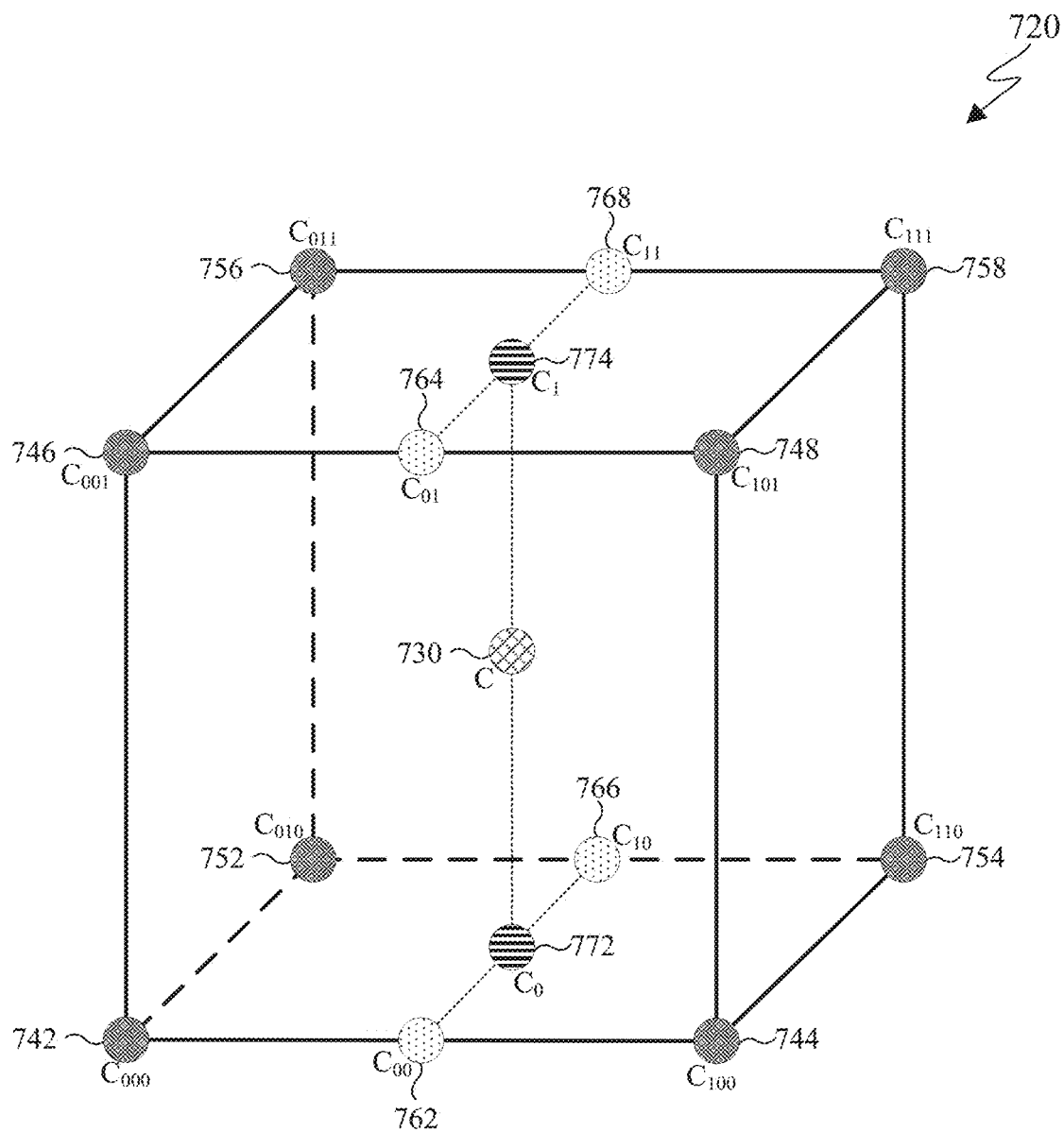
FIG. 7B illustrates an example 3D cell with a query point in accordance with an embodiment of this disclosure.

The smoothing engine 566 applies a filter to the color centroid of the cell with the query point and any remaining neighboring cells to generate a new color. In certain embodiments, the filter can be a tri-linear filter. The tri-linear filter generates a weighted average of the values of the remaining neighboring cells and the cell with the query point, based on the location of the query point within the cell. FIG. 7B, describes generate a new color from a tri-linear filter. As an alternative to tri-linear filtering, other types of filters can be used for generating the new color.

After generating the new color, the smoothing engine 566 compares the color of the query point to the new color. If the distance between the color of the query point and the new color is less than a threshold, no smoothing is performed. The smoothing engine 566 does not modify the color of the query point since the color of the query point is determined to be similar to the new color and therefore is identified as not belonging to an artifact. If the distance between the color of the query point and the new color is greater than a threshold, the smoothing engine 566 replaces the color of the query point with the new color.

In certain embodiments, instead of using neighboring cells for color smoothing, the smoothing engine 566 can replace the color of the query point with the color centroid of the cell that contains the query point. By doing so, the complexity and processing requirements of the color smoothing is decreased as there no need for any filtering.

In certain embodiments, a number of neighboring cells will be selected from the neighboring cells of the cell that includes the query point. The smoothing engine 566 selects the neighboring cells based on the difference of color between the color centroid of the neighboring cells and the color centroid of the current cell. A bi-linear filter can be applied to the color of the neighboring cells to identify the new color. Alternatively, linear interpolation is performed to identify the new color. The smoothing engine 566 selects four neighboring cells whose color centroids are the closest to the color centroid of the cell with the query point. After selecting the cells, the bi-linear filter is applied to the four neighboring cells and the cell that includes the query point to generate the new color. The new color is then compared to the color of the query point. The smoothing engine 566 replaces the color of the query point with the new color if the difference between the new color and the color of the query point is larger than a threshold.

It is noted that there are three separate thresholds that the smoothing engine 566 uses when determining whether smoothing is to be performed. A first threshold is used by the smoothing engine 566 when comparing the internal color value or luminance value of a cell. For example, the difference between the mean and median value of a cell is compared to a first threshold. The first threshold indicates the internal variations within a cell. When the variations (based on the difference between the mean and median value of a cell) is larger than a threshold, it indicates that the cell is highly textured. When the variation of the cell with the query point is larger than the first threshold, smoothing is not performed. When the variation of the neighboring cell with is larger than the first threshold, that cell is excluded from the neighboring cells.

A second threshold is used by the smoothing engine 566 when comparing the color or luminance value of a neighboring cell to the cell with the query point. When the difference between the color or luminance value of a neighboring cell and the cell with the query point is larger than the threshold, the neighboring cell is excluded as a neighboring cell.

A third threshold is used by the smoothing engine 566 when comparing the new color, generated by the weighted average, to the color of the query point. When the difference between the new color and the color of the query point is larger than the threshold, the smoothing engine 566 replaces the color of the query point with the new color.

In certain embodiments, the values of the thresholds are set for the attribute bit depth equal to eight. For other bit depth values, the values for the thresholds can be adopted to the attribute bit depth. A lookup table for each threshold can be populated with the threshold values corresponding to different attribute bit depth values.

After the reconstruction engine 564 reconstructs the point cloud and the smoothing engine 566 removes color artifacts that were inadvertently created while the frames were encoded by the encoding engines 524 of FIG. 5B, the decoder 550 renders the reconstructed point cloud 568. The reconstructed point cloud 568 is rendered and displayed on a display or a head mounted display, similar to the HMD 116 of FIG. 1. The reconstructed point cloud 568 is similar to the 3D point cloud 512.

Although FIGS. 5A-5C illustrate one example of a transmitting a point cloud various changes may be made to FIGS. 5A-5C. For example, additional components can be included in the encoder 510 and the decoder 550.

Figure 6:
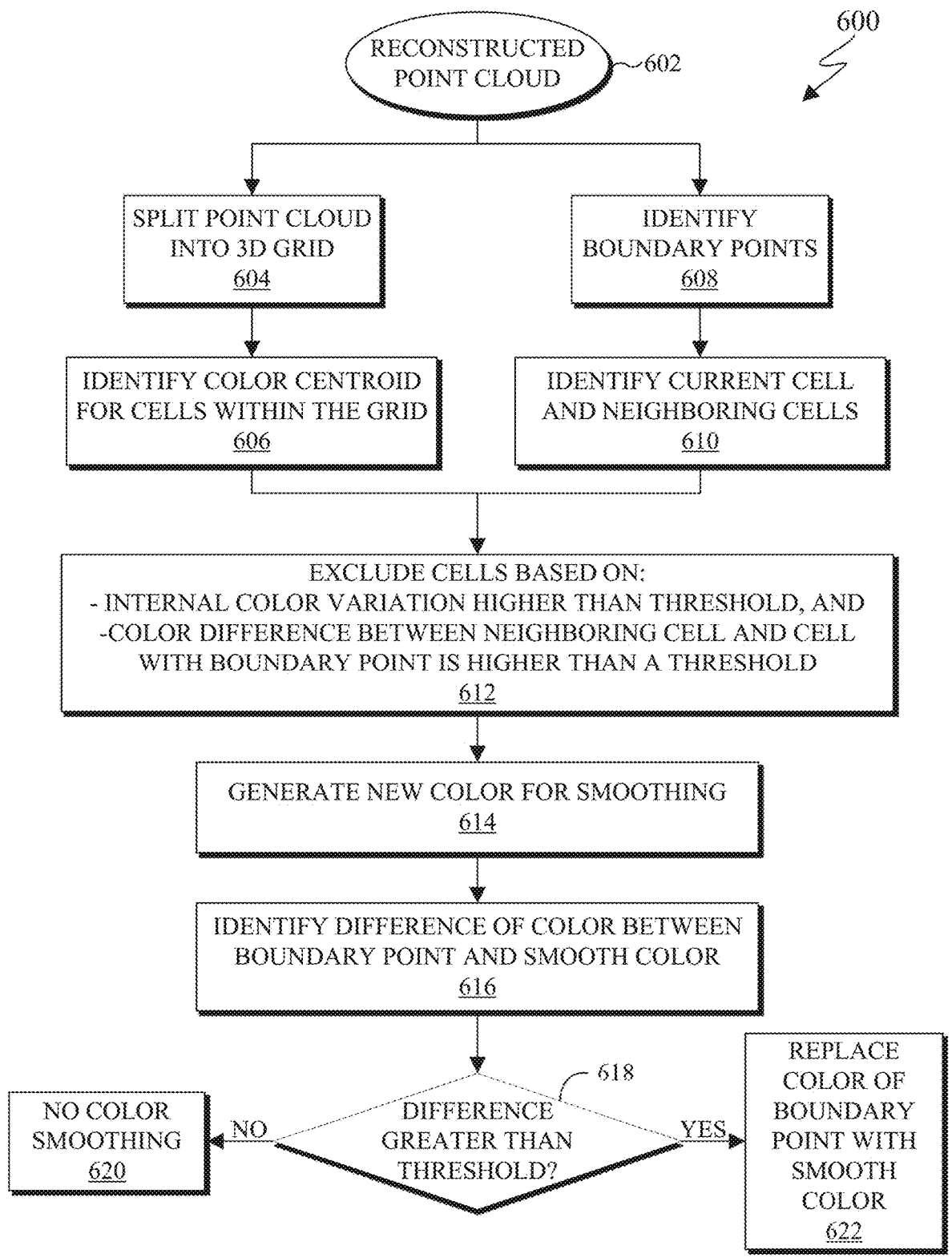
FIG. 6 illustrates an example method for smoothing boundary points in accordance with an embodiment of this disclosure.

FIG. 6 illustrates an example method 600 for smoothing boundary points in accordance with an embodiment of this disclosure The method 600 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 600 is described as being performed by the decoder 550 of FIGS. 5A and 5C.

The decoder 550 reconstructs the point cloud 602 from the decoded frames, such as the decoded geometry frame 518, the decoded texture frame 520 and the decoded occupancy map frame 522. The reconstructed point cloud 602 is similar to the reconstructed point cloud 568 of FIG. 5C, without smoothing.

In certain embodiments, smoothing is performed based on an indication of a flag within the syntax for reconstructing the point cloud. That is, based on the value assigned to a flag indicates whether smoothing is performed. The flag can be denoted as "afp_attribute_smoothing_enabled_flag[aIdx]," where aIdx is the attribute index. For example, when the value of the flag is zero, the decoder 550 performs no smoothing. When no smoothing is performed, the reconstructed point cloud 602 can be rendered and viewed by a user.

When the flag is one, the decoder 550 performs color smoothing on the reconstructed point cloud 602 prior to rendering and displaying the reconstructed point cloud 602. In certain embodiments, multiple inputs are used by the decoder 550 to perform color smoothing on the reconstructed point cloud 602. The decoder 550 uses the occupancy map, denoted as "oFrame," where the occupancy map corresponds to the current point cloud frame at a predefined resolution. The decoder 550 uses the attribute index, aIdx, indicated by the flag, as well as the number of components, denoted as "numComps" which corresponds to the attribute index aIdx.

The decoder 550 uses multiple attribute smoothing control parameters for defining the smoothing constraints. In certain embodiments, the decoder 550 uses a set of five different attribute smoothing control parameters. The different attribute smoothing control parameters include (i) afp_attribute_smoothing_grid_size[aIdx], (ii) afp_attribute_smoothing_threshold[aIdx], (iii) afp_attribute_smoothing_threshold_local_entropy [aIdx], (iv) afp_attribute_smoothing_threshold_variation[aIdx], and (v) afp_attribute_smoothing_threshold_difference[aIdx]. Each of the elements of the attribute smoothing control parameter can be individually predefined or set by the decoder 550 based on the reconstructed point cloud 602. Syntax (1), below, describes the attribute frame parameters.

```
Syntax                                                                    (1)
attribute_frame_params( attributeDimension ) {
    for( i = 0; i < attributeDimension; i++ )
        afp_attribute_smoothing_params_present_flag[ i ]
    afp_attribute_scale_params_present_flag
    afp_attribute_offset_params_present_flag
    for( i = 0; i < attributeDimension; i++ )
        if( afp_attribute_smoothing_params_present_flag[ i ] ) {
            afp_attribute_smoothing_grid_size_minus2[ i ]
            afp_attribute_smoothing_threshold[ i ]
            afp_attribute_smoothing_local_entropy_threshold[ i ]
            afp_attribute_smoothing_threshold_attribute_variation[ i ]
            afp_attribute_smoothing_threshold_
attribute_difference[ i ]
        if( afp_attribute_scale_params_present_flag )
            for( i = 0; i < attributeDimension; i++ )
                afp_attribute_scale[ i ]
        if( afp_attribute_offset_params_present_flag )
            for( i = 0; i < attributeDimension; i++ )
                afp_attribute_offset[ i ]
}
```

In certain embodiments, a flag denoted as "afp_attribute_smoothing_params_present_flag[i]" of Syntax (1) indicates whether the attribute smoothing control parameters are present in the current patch frame attribute parameter set. For example, if the flag is set to zero, it indicates that the attribute smoothing control parameters are not present in the current patch frame attribute parameter set and if the flag is set to one, it indicates that the attribute smoothing control parameters are within the current patch frame attribute parameter set.

The syntax element of "attribute_smoothing_grid_size [i]" corresponds to "afp_attribute_smoothing_grid_size_minus2[i] 2," where the "afp_attribute_smoothing_grid_size_minus2[i]" specifies the value of the variable "AttributeSmoothingGridSize" used for the attribute smoothing. In certain embodiments, the value of "afp_attribute_smoothing_grid_size_minus2" is in the range of 0 to 126, inclusive. If "afp_attribute_smoothing_grid_size_minus2" is not present, the decoder 550 sets its value to zero.

The syntax element of "afp_attribute_smoothing_threshold[i]" of Syntax (1) indicates the attribute smoothing threshold for an attribute associated with "pfaps_attribute_frame_parameter_set_id." In certain embodiments, the value of "afp_attribute_smoothing_threshold" is in the range of 0 to 255, inclusive. If "afp_attribute_smoothing_threshold" is not present, the decoder 550 sets its value to zero.

The syntax element of "afp_attribute_smoothing_local_entropy_threshold[i]" of Syntax (1) indicates the local entropy threshold in the neighbourhood of a boundary point for an attribute associated with pfaps_attribute_frame_parameter_set_id. In certain embodiments, the value of afp_attribute_smoothing_local_entropy_threshold is in the range of 0 to 7, inclusive. If "afp_attribute_smoothing_local_entropy_threshold" is not present, the decoder 550 sets its value to zero.

The syntax element of "afp_attribute_smoothing_threshold_attribute_variation[i]" of Syntax (1) indicates the threshold of attribute variation for the attribute smoothing. In certain embodiments, the value of "afp_attribute_smoothing_threshold_attribute_variation" is in the range of 0 to 255, inclusive. If "afp_attribute_smoothing_threshold_attribute_variation" is not present, the decoder 550 sets its value to 255.

The syntax element of "afp_attribute_smoothing_threshold_attribute_difference[i]" of Syntax (1) indicates the threshold of attribute difference for the attribute smoothing. In certain embodiments, the value of "afp_attribute_smoothing_threshold_attribute_difference" is in the range of 0 to 255, inclusive. If "afp_attribute_smoothing_threshold_attribute_difference" is not present, the decoder 550 sets its value to 255.

The decoder 550 also uses an array that includes the reconstructed attribute values for the attribute index aIdx. The array that includes reconstructed attribute values can be expressed as "recPCAttrSmIn[aIdx][i][j]," where $0 \le i < \text{PointCnt}$, $0 \le j < \text{numComps}$." The decoder 550 also uses an array containing reconstructed geometric positions. The array that includes reconstructed geometric positions can be expressed as "recPCGeomSmOut[i][j]," where $0 \le i < \text{PointCnt}$, $0 \le j \le 2$. In certain embodiments, the array that includes the reconstructed geometric positions of the point cloud that was previously smoothed. The decoder 550 also uses a patch index that includes information corresponding to each point of the "recPCGeomSmOut."

The output of the smoothing is an array that includes the reconstructed smoothed attribute values for index aIdx. The output array can be expressed as "recPCAttrSmOut[aIdx][i][j]," where $0 \le i < \text{PointCnt}$ and $0 \le j < \text{numComps}$."

At step 604, the decoder 550 splits the point cloud into a 3D grid. In certain embodiments, the decoder 550 generates a 3D grid around the reconstructed point cloud 602. The 3D grid is composed of multiple 3D cells. The shape and size of the cells can be uniform throughout the grid or change from cell to cell. In certain embodiments, the size and shape of the cells are uniform such as the grid 700 and the example cell 710 of FIG. 7A. Equation (3), below, describes the size of each cell within the grid, when the size and shape of the cells are uniform throughout the grid. The variable "gridSize" of Equation (3) can be set to AttributeSmoothingGridSize [aIdx]." Equation (4), below, describes the number of cells in each coordinate direction (X, Y, or Z).

$$\text{gridSize} \times \text{gridSize} \times \text{gridSize} \qquad \text{Equation (3)}$$

$$\text{numCells} = \text{cell}(2^{(gps\_geometry\_3d\_coordinates\_bitdepth\_minus1+1)} / \text{gridSize}) \qquad \text{Equation (4)}$$

In certain embodiments, the size and shape of the cells fluctuate based on the reconstructed point cloud 602. For example, a cell can cover a portion of the reconstructed point cloud 602 that is of a similar color. For instance, if the reconstructed point cloud 602 is of a human, such as the 3D point cloud 512 of FIG. 5A, a cell can cover each arm, another cell can cover the face, and multiple smaller cells are positioned over the dress.

In step 606, the decoder 550 identifies the color centroid for the cells within the. In certain embodiments, the decoder 550 identifies the color centroid for each cell within the grid. For example, for a single cell, the decoder 550 identifies the average of the red values, the average of the blue values, and the average of the green values. The resulting red blue and green values represent the color centroid of a single cell within the grid. In certain embodiments, the color centroid uses luminance as a proxy for color. Equation (5), below, describes the luminance value that corresponds to an attribute value, attrValue[k], where k is less than three and greater than or equal to zero ($0 \le k < 3$). It is noted that Equation (5) is similar to Equation (2).

$$\text{Luma value} = 0.2126 \ast \text{attrValue}[0] + 0.7152 \ast \text{attrValue}[1] + 0.722 \ast \text{attrValue}[2] \qquad \text{Equation (5)}$$

In certain embodiments, four arrays are generated and initialized to zero for all x, y, and z ion the range of 0 to (numCells-1). The four arrays are (i) cellCnt[x][y][z], (ii) cellPatchIndex[x][y][z], (iii) cellDoSmoothing[x][y][z], and (iv) attyCenterGrid[x][y][k], where k is in the range from 0 to "numComps". If "cellCnt[xIdx][yIdx][zIdx]" is equal to zero, then "cellPatchIndex[xIdx][yIdx][zIdx]" is set to the index of the patch which includes the current point from the "recPCGeomSmOut." If "cellCnt[xIdx][yIdx][zIdx]" does not equal zero and "cellPatchIndex[xIdx][yIdx][zIdx]" is not equal to the index of the patch that contains the current point from "recPCGeomSmOut," then the decoder 550 sets "cellDoSmoothing[xIdx][yIdx][zIdx]" to 1. It is noted that xIdx equals "recPCGeomSmOut[i][0]/gridSize)," yIdx equals "recPCGeomSmOut[i][1]/gridSize," and zIdx equals "recPCGeomSmOut[i][2]/gridSize." Syntax (2), below, describes how the decoder 550 modifies "attrCenterGrid" and "cellCnt." After "attrCenterGrid" and "cellCnt" are modified, Syntax (3), below, described the decoder 550 normalizes "attrCenterGrid" by the "cellCnt."

```
Syntax                                                              (2)
for(k=0; k<numComps;k++)
    attrCenterGrid[xIdx][yIdx][zIdx][k]+=recPCAttrSmIn[aIdx][idx][k]
cellCnt[xIdx][yIdx][zIdx]++
Syntax        (3)
for( x=0; x < numCells; x++)
    for( y=0; y < numCells; y++)
        for( z=0; z < numCells; z++)
            if( cellCnt[x][y][z] > 0)
                for( k=0; k < numComps; k++)
                    attrCenterGrid[x][y][z][k]=attrCenterGrid[x][y][z][k]
                                              /cellCnt[x][y][z]
```

If the expression "cellCnt[x][y][z]" is greater than 0 for x, y, z in the range 0 to (numCells-1), the mean and median luminance values of attribute with index aIdx, for points belonging to that cell are calculated and assigned to arrays meanLuma[x][y][z] and medianLuma[x][y][z], respectively. The luminance value of "attrCenterGrid" is assigned to centroidLuma[x] [y] [z].

In step 608, the decoder 550 identifies the points within the reconstructed point cloud 602 that were represented as pixels that were positioned on a boundary of one of the patches within the geometry frames 518 or the texture frames 520. In certain embodiments, the decoder 550 identifies the points within the reconstructed point cloud 602 that were represented as pixels that were positioned near a boundary of one of the patches within the geometry frames 518 or the texture frames 520.

In certain embodiments, an array denoted as "recPCBoundary[idx]" is generated, where (0≤idx<PointCnt). The array as "recPCBoundary[idx]" identifies whether each point from the recPCgeomSmOut is a boundary point. If recPCBoundary[i]" is equal to one, then Syntax (4), below, describes pointGeom[j] and pointAttr[k], where j is in the range of zero to two, and k is in the range of zero to one less than "numComps."

```
Syntax                                                          (4)
for( j = 0; j < 3 ; j++ )
    pointGeom[ j ] = recPCGeomSmOut[ i ][ j ]
for( k = 0; k < numComps ; k++ )
    pointAttr[ k ] = recPCAttrSmIn[ aIdx ][ i ][ k ]
```

In step 610, the decoder 550 identifies a cell that includes a boundary point. If the cell includes multiple boundary points, the decoder 550 selects a single boundary point as the query point. Based on the position of the query point within the cell, the decoder 550 selects multiple neighboring cells, including the cell containing the query point. Syntax (5), below, describes selecting the neighborhood of cells.

```
Syntax                                                          (5)
for( k = 0; k < 3 ; k++ ) {
    t[ k ] = ( pointGeom[ k ] / gridSize )
    s[ k ] = t[ k ] + ( ( ( pointGeom[ k ] % gridSize ) < ( gridSize / 2 ) ) ? -1 : 0 )
}
otherClusterPtCnt = 0
for( dx = 0; dx < 2; dx++ ) {
    for( dy = 0; dy < 2; dy++ ) {
        for( dz = 0; dz < 2; dz++ ) {
            xIdx = s[ 0 ] + dx
            yIdx = s[ 1 ] + dy
            zIdx = s[ 2 ] + dz
            otherClusterPtCnt=otherClusterPtCnt |doSmoothing[xIdx][yIdx][zIdx]
        }
    }
}
```

In step 612, the decoder 550 determines whether to exclude any of the neighboring cells. The decoder 550 first determines whether the internal color is variation of the cell with the query point is higher than a threshold. The color variation is represented as the luminance of the cell itself. Syntax (6), below, describes the decoder 550 comparing the luminance of the cell with the boundary point to a threshold. For example, the decoder 550 compares the difference between the mean luminance value and the median luminance value to a threshold. If the luminance value of the cell with the boundary point is higher than the threshold, the decoder 550 determines that smoothing is not necessary for the boundary points within the cell, and then excludes the cell. If the luminance value of the cell with the boundary point is lower than the threshold, the decoder 550 determines that smoothing is necessary, and the cell with the boundary point is not excluded.

```
Syntax                                                          (6)
for( dx = 0; dx < 2; dx++ )
    for( dy = 0; dy < 2; dy++ )
        for( dz = 0; dz < 2; dz++ ) {
            xIdx = s[ 0 ] + dx
            yIdx = s[ 1 ] + dy
            zIdx = s[ 2 ] + dz
            if( ( xIdx == t[0] ) && ( yIdx == t[1] ) && ( zIdx == t[2] ) ) {
                isOriginalCell[ dx ][ dy ][ dz ] = 1
                for( k=0; k < numComps; k++ )
                    currAttr[ k ] = pointAttr[ k ]
```

```
            if(abs(meanLuma[xIdx][yIdx][zIdx]-medianLuma[xIdx][yIdx][zIdx])
                    <= afp_attribute_smoothing_threshold_variation[ aIdx ] ) {
                lumaOrig = centroidLuma[ xIdx ][ yIdx ][ zIdx ]
                for( k=0; k < numComps; k++ )
                    attrCentroid[dx][dy][dx][k]=attrCenterGrid[xIdx][yIdx][zIdx][k]
            } else {
                lumaOrig=0.2126*currAttr[0]+0.7152*currAttr[1]+0.0722*currAttr[2]
                for( k=0; k < numComps; k++ )
                    attrCentroid[ dx ][ dy ][ dx ][ k ] = currAttr[ k ]
                }
            }
        Else
            isOriginalCell[ dx ][ dy ][ dz ] = 0
}
```

Syntax (7), below, describes the variation in luminance values within the neighboring cell and the difference between luminance values of the original cell and neighboring cells. That is, Syntax (7) describes the decoder 550 excluding neighboring cells whose internal color variation is higher than a threshold. That is, the decoder 550 compares the difference between the mean luminance value and the median luminance value for each respective neighboring cell to a threshold. For example, if there are 7 neighboring cells, the decoder 550 compares takes the difference of the mean luminance value and the median luminance of each of the neighboring cells and compares each of the resulting luminance values to a threshold. For any cell whose luminance value is above the threshold, that cell is excluded. To exclude a neighboring cell the decoder 550 simply unselects the cell as a neighboring cell.

Syntax (7) also describes the decoder 550 excluding neighboring cells by comparing the color of the neighboring cells to the cell with the query point. The decoder 550 compares the distances between the color centroid of the neighboring cells to the cell with the query point to another threshold. When the color difference between the neighboring cell and the cell with the query point is larger than the threshold, that neighboring cell is excluded. The decoder 550 performs this comparison to each neighboring cell.

In certain embodiments, the decoder 550 identifies the entropy of the luminance values in the cell that includes the query point. Equation (6) describes the decoder 550 identifying the entropy of the luminance values in the cell that includes the query point. In Equation (6), the variable pi denotes the probability of the luminance taking the value i, and the variable h denotes the entropy of the luminance of the cell that includes the query point. If the local entropy of the cell that includes the query point is larger than a threshold, the decoder 550 determines not to perform the smoothing. Alternatively, if the local entropy of the cell that includes the query point is lower than a threshold, the decoder 550 determines that smoothing would improve the visual quality of the reconstructed point cloud.

$$h = -\sum_{i=0}^{255} p_i * \log_2(p_i)$$ Equation (6)

In step 614, the decoder 550 generates a new color for color smoothing. The new color is based on the color of the cell with the query point and any neighboring cells that were not previously excluded. For example, the new color is generated by applying a weighted average of any neighboring cell that was not excluded in step 612. The weighted average is based on the location of the query point within the

```
Syntax                                                                            (7)
for( dx = 0; dx < 2; dx++ )
    for( dy = 0; dy < 2; dy++ )
        for( dz = 0; dz < 2; dz++ ) {
            xIdx = s[ 0 ] + dx
            yIdx = s[ 1 ] + dy
            zIdx = s[ 2 ] + dz
            if( isOriginalCell[ dx ][ dy ][ dz ] == 0 )
                if( cellCnt[ xIdx ][ yIdx ][ zIdx ] > 0 ) {
                    for( k=0; k < numComps; k++ )
                        attrCentroid[ dx ][ dy ][ dx ][ k ] =
attrCenterGrid[ xIdx ][ yIdx ][ zIdx ][ k ]
                    lumaN = centroidLuma[ xIdx ][ yIdx ][ zIdx ]
                    diff = abs( lumaOrig - lumaN )
                    var =
meanLuma[ xIdx ][ yIdx ][ zIdx ] - medianLuma[ xIdx ][ yIdx ][ zIdx ]
                    if( ( diff > afp_attribute_smoothing_threshold_difference[ aIdx ] ) ||
                        ( abs( var ) > afp_attribute_smoothing_threshold_variation[ aIdx ] ) )
                        for( k=0; k < numComps; k++ )
                            attrCentroid[ dx ][ dy ][ dx ][ k ] = currAttr[ k ]
                    } else {
                        for( k=0; k < numComps; k++ )
                            attrCentroid[ dx ][ dy ][ dx ][ k ] = currAttr[ k ]
                    }
                }
}
``` cell. For example, neighboring cells that are closer to the query point are given a higher weight than cells located further from the query point.

In certain embodiments, tri-linear filter is used to generate the new color. For example, the tri-linear filter is applied to the cell with the query point and the remaining neighboring cells to generate the new color. Syntax (8), below, describes the decoder 550 setting describes the weights for an eight-tap tri-linear filter. Syntax (9), below, describes the decoder 550 applying the tri-linear filter to generate the new color.

There are eight neighboring cells of the 3D cell 720. In this example, none of the neighboring cells were excluded. The smoothing engine 566, of FIG. 5C, identifies the color centroid of each of the eight neighboring cells. The color centroid 742 is the color centroid of the first neighboring cell. The color centroid 744 is the color centroid of the second neighboring cell. The color centroid 746 is the color centroid of the third neighboring cell. The color centroid 748 is the color centroid of the fourth neighboring cell. The color centroid 752 is the color centroid of the fifth neighboring

```
Syntax                                                                    (8)
for( k = 0; k < 3 ; k++ ) {
    w[k][1] = ( pointGeom[ k ] - s[ k ] * gridSize - (gridSize / 2) ) * 2 + 1
    w[k][0] = ( gridSize * 2 - w[ k ][1] )
}
Syntax       (9)
for( k = 0; k < numComps; ++) {
    filtAttr[ k ] = 0
    for( dx = 0; dx < 2; dx++ )
        for( dy = 0; dy < 2; dy++ )
            for( dz = 0; dz < 2; dz++ )
                filtAttr[ k ] += w[ 0 ][ dx ] * w[ 1 ][ dy ] * w[ 2 ][ dz ]*
attrCentroid[ dx ][ dy ][ dz ][ k ]
    filtAttr[ k ] /= ( 8 * gridSize * gridSize * gridSize )
}
```

In step 618, the decoder 550 compares the new color to the color of the query point. If the difference between the color of the query point and the new color is smaller than a threshold, then in step 620, the decoder determines that no color smoothing is necessary for the query point, since the difference between the color of the query point and the new color is small. If the difference between the color of the query point and the new color is larger than a threshold, then in step 622, the decoder determines that color smoothing is necessary as the color difference between the color of the query point and the new color is large and an artifact is likely to be present at the query point. In certain embodiments, the method 600 is repeated for each point that corresponds to a pixel that was positioned on a boundary of one of the patches in a frame.

Although FIG. 6 illustrates one example of a smoothing various changes may be made to FIG. 6. For example, while shown as a series of steps, various steps in FIG. 6 could overlap, occur in parallel, or occur any number of times.

FIG. 7A illustrates an example grid 700 and cells in accordance with an embodiment of this disclosure. FIG. 7B illustrates an example 3D cell 720 with a query point 730 in accordance with an embodiment of this disclosure. The embodiments of FIGS. 7A and 7B are for illustration only. Other embodiments can be used without departing from the scope of this disclosure.

The grid 700 is composed of multiple cells, such as the cell 710. As illustrated the grid 700 is composed of 1,000 cells (10 cells in the height, 10 cells in width, and 10 cells length) of uniform size and shape. In other embodiments (not illustrated), any number of cells can be used and the cells can be any shape. The grid 700 is sized to fully cover a reconstructed point cloud. For example, the reconnected point cloud 568 is positioned within the grid 700.

The 3D cell 720 of FIG. 7B includes a query point 730. The 3D cell 720 can be included in the grid 700. The 3D cell 720 can include multiple points of a reconstructed 3D point cloud, but only a single query point is illustrated. Prior to reconstructing the point cloud, the query point 730 was represented as a pixel that was at a border of one of the patches within a frame. The query point 730 is located at coordinates (X, Y, Z).

cell. The color centroid 754 is the color centroid of the sixth neighboring cell. The color centroid 756 is the color centroid of the seventh neighboring cell. The color centroid 758 is the color centroid of the eighth neighboring cell.

Equations (7)-(10) describe the smoothing engine 566 applying a tri-linear filter along the X axis. In particular, the Equations (7)-(10) describe the weighted average color 762, 764, 766, and 768 in the x direction. Equation (11) describes the variable $x_d$, where $x_0$ corresponds to the lattice point below x, and $x_1$ corresponds to the lattice point above x.

$$C_{00}=C_{000}(1-x_d)+C_{100}X_d \qquad \text{Equation (7)}$$

$$C_{01}=C_{001}(1-X_d)C_{101}X_d \qquad \text{Equation (8)}$$

$$C_{10}=C_{010}(1-X_d)C_{110}X_d \qquad \text{Equation (9)}$$

$$C_{11}=C_{011}(1-X_d)C_{111}X_d \qquad \text{Equation (10)}$$

$$x_d=(x-x_0)/(x_1-x_0) \qquad \text{Equation (11)}$$

Equations (12) and (13) describe the smoothing engine 566 applying a tri-linear filter along the Y axis. In particular, the Equations (12) and (13) describe the weighted average color 772 and 774 in the y direction. Equation (14) describes the variable $y_d$, where $y_0$ corresponds to the lattice point below y, and $y_1$ corresponds to the lattice point above y.

$$C_0=C_{00}(1-y_d)+C_{10}y_d \qquad \text{Equation (12)}$$

$$C_1=C_{01}(1-y_d)+C_{11}y_d \qquad \text{Equation (13)}$$

$$y_d=(y-y_0)/(y_1-y_0) \qquad \text{Equation (14)}$$

Equation (15) describes the smoothing engine 566 interpolating along the z axis. In particular, the Equation (15) describes the weighted average color for the query point 730 in the z direction. Equation (16) describes the variable $z_d$, where $z_0$ corresponds to the lattice point below z, and $z_1$ corresponds to the lattice point above z.

$$C=C_0(1-z_d)+C_1z \qquad \text{Equation (15)}$$

$$z_d=(z-z_0)/(z_1-z_0) \qquad \text{Equation (16)}$$

As described in Equations (7)-(16), the tri-linear filter uses the color centroids of the neighboring cells to generate a new color of the query point. The new color is based on the weighted average of the color centroids, where more weight is given to the color centroids whose geometrical position is closer to the query point and provides less weight to the color centroid of the neighboring cells whose geometrical position is further from the query point.

A certain number of cells are selected as neighboring cells. The predetermined number of neighboring cells are selected based on the geometrical distance from the query point. That is, the neighboring cells that are selected are the geometrically closest cells to the query point. After the neighboring cells that are selected, one or more of the neighboring cells can be excluded. A neighboring cell is excluded if the internal luminance within the neighboring cell is larger than a threshold or the luminance difference between the neighboring cell and the cell with the query point is larger than a threshold. If none of the neighboring cells are excluded, the new color is generated as described above with respect to Equations (7)-(16). For each of the neighboring cells that are excluded, the color centroid that cell is not used when generating the new color.

Although FIGS. 7A and 7B illustrate an example grid and tri-linear filtering of neighboring cells within the grid various changes may be made to FIGS. 7A and 7B. For example, the size and shapes of the cells can vary and other types of weighted filters can be applied to identify the weighted color of a query point, such as the query point 730.

Figure 8:
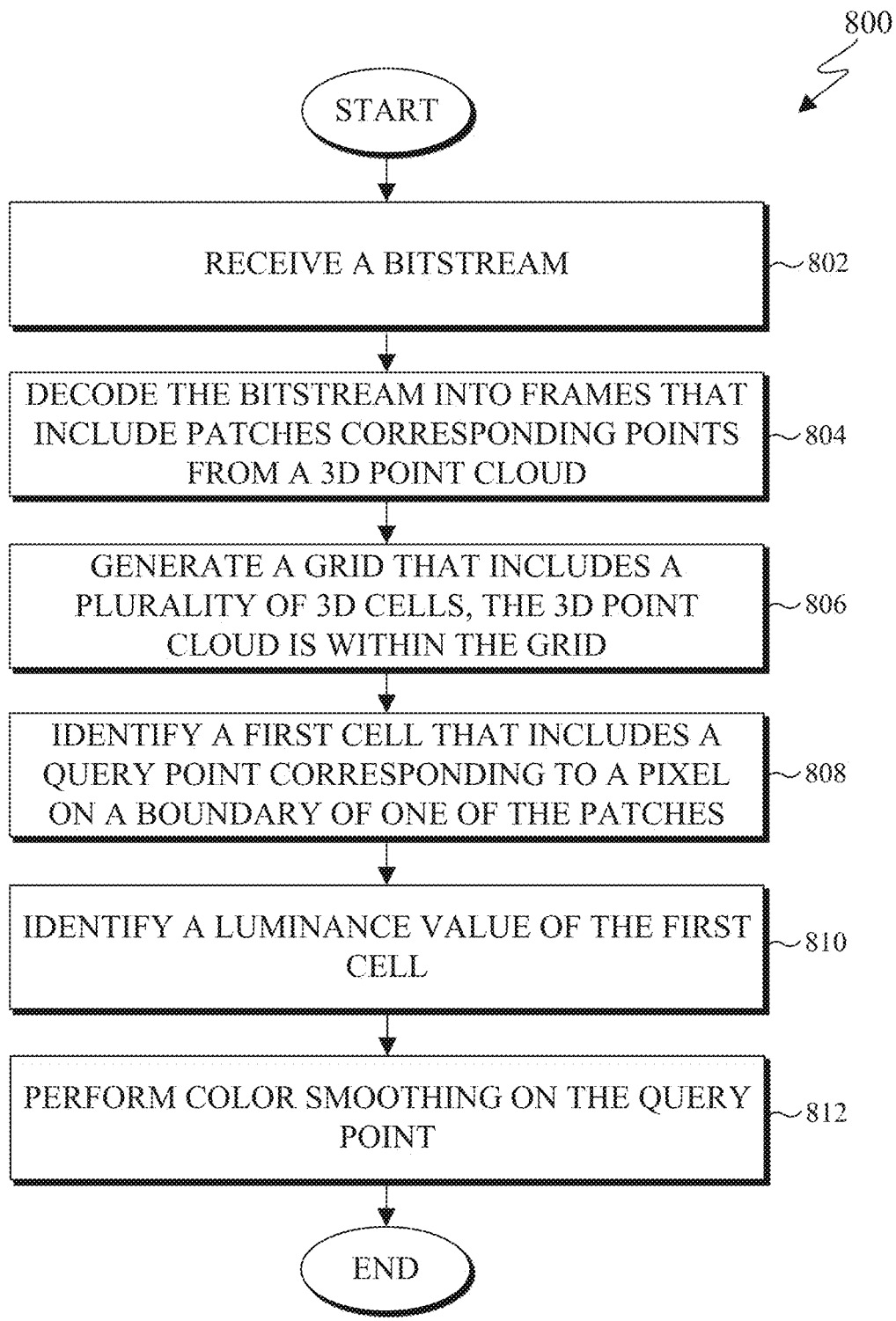
FIG. 8 illustrates example method for decoding a point cloud in accordance with an embodiment of this disclosure.

FIG. 8 illustrates example method for decoding a point cloud in accordance with an embodiment of this disclosure. The method 800 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 800 is described as being performed by the decoder 550 of FIGS. 5A and 5C.

The method 800 begins with the decoder, such as decoder 550, receiving a bitstream (step 802). The received bitstream can include an encoded point cloud that was mapped onto multiple 2D frames, compressed, and then transmitted and ultimately received by the decoder 550.

In step 804, the decoder 550 decodes the bitstream into a multiple frames that represent a 3D point cloud. For example, a first frame can represent geometry information of the points of the point cloud, a second frame represents color information of the points of the point cloud, and a third frame represents an occupancy map. In certain embodiments, additional frames that represent other attributes can be decoded. The first and second frames include pixels that are organized into patches that represent respective clusters of points from the 3D point cloud. The occupancy map identifies the pixels in the first and second frames that are valid as well as the pixels that are invalid. There is a correspondence (or a mapping) between the patches in a frame that includes geometry information and each additional texture frame. For example, if the pixel location (i, j) within a patch in the geometry frame stores the geometry information (such as depth) of the kth point in the point cloud, then the color of the kth point is stored at pixel location (i, j) the associated color frame.

The decoder 550 reconstructs the 3D point cloud from the decoded multiple frames. In step 806 the decoder 550 generates a grid that includes a plurality of cells and. The reconstructed 3D point cloud is within the generated grid. The grid is sized such that the reconstructed 3D point cloud is fully within the generated grid. In certain embodiments, the size and shape of the cells can vary from cell to cell within a single grid. In certain embodiments, the size and shape of the cells are uniform. The cells within the grid do not overlap. In certain embodiments, all of the cells within the grid are of a 4×4×4 size, which can include up to 64 points.

In step 808, the decoder 550 identifies a cell that includes a query point, where the query point corresponds to a pixel that was positioned on a patch boundary of one of the multiple frames. For example, the decoder 550 inspects the occupancy map frame to identify the valid pixels that neighbor an invalid pixel. In certain embodiments, the decoder 550 then generates a list of points, which correspond to the valid pixels that neighbor one or more invalid pixel. For each of the points in the list, the decoder 550 determines whether the points need to be smoothed and, performs the smoothing, as necessary.

In step 810, the decoder 550 identifies the luminance value of the cell that includes the query point. To identify the luminance value, the decoder 550 identifies the luminance values of each point that is within the cell. The decoder 550 then identifies the mean and median luminance values for all of the points within the cell. The luminance value of the cell is the difference between the mean luminance values for all of the points within the cell and median luminance values for all of the points within the cell.

The decoder 550 compares the luminance value of the cell with the query point to a threshold. If the luminance value of the cell is larger than the threshold, the decoder 550 does not perform the color smoothing of the query point. When luminance value of the cell is larger than the threshold, indicates that the cell is highly textured and the presence of an artifact would negligibly reduce the visual quality of the reconstructed point cloud, as such, smoothing is not necessary. Thereafter the decoder 550 selects another point, which corresponds to a valid pixel that neighbors at least one invalid pixel, as the query point.

When the luminance value of the cell is less than the threshold, the decoder 550 performs the color smoothing of the query point (step 812). In one embodiment, to perform color smoothing the decoder 550 identifies a color centroid of the cell with the query point. The color centroid is the average of the red values, the green values, and the blue values. The decoder 550 replaces the color of the query point with the centroid color of the cell with the query point.

In certain embodiments, to perform color smoothing the decoder 550 selects a predetermined number of cells that neighbor the cell with the query point. It is noted that a single cell has twenty six neighbors. A predetermined quantity of neighboring cells are selected based on the geometric distance between each cell and the query point. The decoder 550 selects the neighboring cells which are geometrically closest to the query point. For example, the if the query point is in the lower left part of the cell, then the decoder 550 selects the neighboring cells that are located to the left and below the current cell. In certain embodiments, the predetermined number of cells that neighbor the cell with the query point is eight neighboring cells. In certain embodiments, the predetermined number of cells that neighbor the cell with the query point is seven neighboring cells.

After selecting a predetermined number of neighboring cells based on the position of the query point, the decoder 550 determines whether to exclude any of the selected neighboring cells from the neighboring cells. The decoder 550 determines whether to exclude any of the neighboring cells as neighboring cells based on the internal luminance values of each of the selected neighboring cells. For example, the decoder 550 identifies the mean and median luminance values for the points within each of the neighboring cell. The luminance value for each of the neighboring cells is the difference between the mean luminance values for all of the points within one of the neighboring cells and median luminance values for all of the points within the same neighboring cell. The decoder 550 then compares the luminance values of each of the neighboring cells to a threshold. If the luminance value of a neighboring cell is larger than the threshold, that neighboring cell is excluded from the selected neighboring cells. If the luminance value of a neighboring cell is equal to or less than the threshold, that neighboring cell remains one of the selected neighboring cells.

The decoder 550 also determines whether to exclude any of the neighboring cells as neighboring cells based on comparing the luminance of the neighboring cells to the luminance of the cell that includes the query point. In certain embodiments, the decoder 550 compares the color (the average of the red values, the green values, and the blue values) of the neighboring cells to the color (the average of the red values, the green values, and the blue values) of the cell that includes the query point. The decoder 550 identifies the luminance value of each of the neighboring cells. The luminance value for each of the neighboring cells is the difference between the mean luminance values for all of the points within one of the neighboring cells and median luminance values for all of the points within the same neighboring cell. The decoder 550 then identifies the distance between the luminance values of each of the neighboring cells the luminance value of the cell with the query point. When the distance between the luminance value of a neighboring cell and the luminance value of the cell with the query point is larger than a second threshold, that neighboring cell is excluded from the selected neighboring cells. When the distance between the luminance value of a neighboring cell and the luminance value of the cell with the query point is less than the second threshold, that neighboring cell is remains one of the selected neighboring cells.

In certain embodiments, the decoder 550 compares the local entropy of the cell with the query point against a threshold. If the local entropy of the cell is larger than the threshold, the decoder 550 determines not to perform smoothing. If the local entropy of the cell is less than the threshold, the decoder identifies a new color based on the remaining neighboring cells. In certain embodiments, the step of comparing the local entropy of the cell with the query point to a threshold is skipped.

After determining whether to exclude any of the neighboring cells, the decoder 550 identifies a new color based on the remaining neighboring cells. In certain embodiments, the decoder 550 identifies a color centroid for each of the remaining neighboring cells as well as the cell with the query point. The decoder then performs a weighted average based on the distance each of the remaining neighboring cells are to the query point, to generate a new color. The weighted average is based on the average of the red values, the green values, and the blue values for each of the cells. In certain embodiments, the decoder 550 applies a tri-linear filter to the remaining neighboring cells and the cell with the query point to generate the new color.

After identifying the new color, the decoder 550 compares the new color to the color of the query point. If the distance between the new color and the query point is less than a third threshold, then the decoder 550 determines not to replace the color of the query point with the new color, as the color of the query point and the new color are similar. Thereafter the decoder 550 selects another point, which corresponds to a valid pixel that neighbors at least one invalid pixel, as the query point. If the distance between the new color and the query point is greater than the third threshold, then the decoder 550 replaces the color of the query point with the new color. The decoder 550 replaces the color of the query point with the new color since the color of the query point is different than the new color, creating a strong likelihood of the presence an artifact which reduces the visual quality of the point cloud. Thereafter the decoder 550 selects another point, which corresponds to a valid pixel that neighbors at least one invalid pixel, as the query point.

Although FIG. 8 illustrates one example of a smoothing various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
   a communication interface configured to receive a bitstream; and
   a processor operably coupled to the communication interface, wherein the processor is configured to:
      decode the bitstream into multiple frames that include patches corresponding to respective clusters of points from a 3D point cloud;
      generate a grid that includes a plurality of 3D cells, wherein the 3D point cloud is within the grid;
      identify a first cell, of the plurality of 3D cells, that includes a query point corresponding to a pixel on a boundary of one of the patches;
      identify a luminance value of the first cell; and
      perform color smoothing on the query point based on comparison of the luminance value of the first cell to a threshold.

2. The decoding device of claim 1, wherein to identify the luminance value of the first cell, the processor is configured to:

identify luminance values of the points within the first cell;

identify a mean value and a median value based on the luminance values of the points within the first cell; and identify the luminance value of the first cell based on a difference between the mean value and the median value.

3. The decoding device of claim 1, wherein to smooth the query point, the processor is configured to:

identify neighboring cells of the first cell, based on a position of the query point within the first cell; and generate a new color for the query point based on the neighboring cells and the first cell.

4. The decoding device of claim 3, wherein the processor is further configured to:

identify luminance values of the points within a first neighboring cell of the neighboring cells;

identify a mean value and a median value based on the luminance values of the points within the first neighboring cell;

exclude the first neighboring cell as one of the neighboring cells when a difference between the mean value and the median value of the first neighboring cell is greater than the threshold; and generate the new color for the query point based on the first cell and the neighboring cells that remain.

5. The decoding device of claim 3, wherein the processor is further configured to:

identify a luminance value of a first neighboring cell of the neighboring cells;

exclude the first neighboring cells as one of the neighboring cells when a difference between the luminance value of the first cell and the luminance value of the first neighboring cells is greater than a second threshold; and generate the new color for the query point based on the first cell and the neighboring cells that remain.

6. The decoding device of claim 3, wherein generate the new color, the processor is configured to:

identify a color centroid of each of the neighboring cells and the first cell; and generate the new color based on a weighted average of the color centroid of each of the neighboring cells and the first cell.

7. The decoding device of claim 6, wherein the processor is configured to apply a tri-linear filter to the neighboring cells and the first cell to generate the new color.

8. The decoding device of claim 3, wherein the processor is further configured to:

identify a color of the query point within the first cell;

determine a distance between the new color and the color of the query point; and replace the color of the query point with the new color, when the distance is greater than another threshold.

9. The decoding device of claim 1, wherein, to smooth the query point, the processor is configured to:

identify a color centroid of the first cell, replace a color of the query point with the color centroid of the first cell.

10. The decoding device of claim 1, wherein the plurality of 3D cells within the grid do not overlap.

11. A method for point cloud decoding comprising:

receiving a bitstream;

decoding the bitstream into multiple frames that include patches corresponding to respective clusters of points from a 3D point cloud;

generating a grid that includes a plurality of 3D cells, wherein the 3D point cloud is within the grid;

identifying a first cell, of the plurality of 3D cells, that includes a query point corresponding to a pixel on a boundary of one of the patches;

identifying a luminance value of the first cell; and performing color smoothing on the query point based on comparison of the luminance value of the first cell to a threshold.

12. The method of claim 11, wherein identifying the luminance value of the first cell comprises:

identifying luminance values of the points within the first cell;

identifying a mean value and a median value based on the luminance values of the points within the first cell; and identifying the luminance value of the first cell based on a difference between the mean value and the median value.

13. The method of claim 11, wherein smoothing the query point comprises:

identifying neighboring cells of the first cell, based on a position of the query point within the first cell; and generating a new color for the query point based on the neighboring cells and the first cell.

14. The method of claim 13, further comprising:

identifying luminance values of the points within a first neighboring cell of the neighboring cells;

identifying a mean value and a median value based on the luminance values of the points within the first neighboring cell;

excluding the first neighboring cell as one of the neighboring cells when a difference between the mean value and the median value of the first neighboring cell is greater than the threshold; and generating the new color for the query point based on the first cell and the neighboring cells that remain.

15. The method of claim 13, further comprising:

identifying a luminance value of a first neighboring cell of the neighboring cells;

excluding the first neighboring cells as one of the neighboring cells when a difference between the luminance value of the first cell and the luminance value of the first neighboring cells is greater than a second threshold; and generating the new color for the query point based on the first cell and the neighboring cells that remain.

16. The method of claim 13, wherein generating the new color comprises:

identifying a color centroid of each of the neighboring cells and the first cell; and generating the new color based on a weighted average of the color centroid of each of the neighboring cells and the first cell.

17. The method of claim 16, further comprises applying apply a tri-linear filter to the neighboring cells and the first cell to generate the new color.

18. The method of claim 13, further comprising:

identifying a color of the query point within the first cell;

determining a distance between the new color and the color of the query point; and replacing the color of the query point with the new color, when the distance is greater than another threshold.

19. The method of claim 11, wherein smoothing the query point comprises:

identifying a color centroid of the first cell, replacing a color of the query point with the color centroid of the first cell.

20. The method of claim 11, wherein the plurality of 3D cells within the grid do not overlap.

* * * * *